(12) United States Patent
Greenwood et al.

(10) Patent No.: US 7,277,615 B2
(45) Date of Patent: Oct. 2, 2007

(54) FIBER OPTIC CABLE HAVING A DRY INSERT AND METHODS OF MAKING THE SAME

(75) Inventors: Jody L. Greenwood, Hickory, NC (US); Kenneth D. Temple, Jr., Newton, NC (US); Keith H. Lail, Connelly Springs, NC (US); David A. Seddon, Hickory, NC (US); Randall Tuttle, Conover, NC (US)

(73) Assignee: Corning Cable Systems, LLC., Hickory, NC (US)

( * ) Notice: Subject to any disclaimer, the term of this patent is extended or adjusted under 35 U.S.C. 154(b) by 0 days.

(21) Appl. No.: 11/351,456

(22) Filed: Feb. 10, 2006

(65) Prior Publication Data

US 2006/0165355 A1    Jul. 27, 2006

Related U.S. Application Data

(63) Continuation-in-part of application No. 10/862,541, filed on Jun. 7, 2004, now Pat. No. 7,177,507, which is a continuation-in-part of application No. 10/847,807, filed on May 18, 2004, which is a continuation-in-part of application No. 10/661,204, filed on Sep. 12, 2003, which is a continuation-in-part of application No. 10/326,022, filed on Dec. 19, 2002, now Pat. No. 6,970,629.

(51) Int. Cl.
*G02B 6/44* (2006.01)

(52) U.S. Cl. .................. 385/100; 385/105; 385/113

(58) Field of Classification Search ................ 385/100, 385/102, 105, 107, 110, 113
See application file for complete search history.

(56) References Cited

U.S. PATENT DOCUMENTS

| | | | | |
|---|---|---|---|---|
| 4,078,853 | A | * | 3/1978 | Kempf et al. ................ 385/114 |
| 4,226,504 | A | | 10/1980 | Bellino ..................... 350/96.23 |
| 4,420,220 | A | | 12/1983 | Dean et al. .............. 350/96.23 |
| 4,446,686 | A | | 5/1984 | Panuska et al. ................. 57/6 |
| 4,701,015 | A | | 10/1987 | Saito et al. .............. 350/96.23 |

(Continued)

FOREIGN PATENT DOCUMENTS

DE          2434280          7/1974

(Continued)

OTHER PUBLICATIONS

Norris, R. H.; Weimann, P.A., "Dry Central Tube Ribbon Cables for the Outside Plant Environment", Proc. Of the 51st Intern. Wire & Cable Symposium, p. 202-210 (2002).

(Continued)

*Primary Examiner*—Hae Moon Hyeon

(57) ABSTRACT

A fiber optic cable and a method of making the same include at least one optical waveguide, at least one dry insert and a cable jacket. The at least one optical waveguide and at least one dry insert are at least partially disposed within a cavity of the cable jacket. In one embodiment, the cable includes a first dry insert and a second dry insert disposed within the cavity so that the at least one optical waveguide is disposed between the first dry insert and the second dry insert.

75 Claims, 13 Drawing Sheets

U.S. PATENT DOCUMENTS

| | | | |
|---|---|---|---|
| 4,705,571 A | 11/1987 | Lange et al. | 106/287 |
| 4,707,569 A | 11/1987 | Yoshimura et al. | 174/116 |
| 4,725,628 A | 2/1988 | Garvey et al. | 521/137 |
| 4,725,629 A | 2/1988 | Garvey et al. | 521/137 |
| 4,815,813 A | 3/1989 | Arroyo et al. | 350/96.23 |
| 4,818,060 A | 4/1989 | Arroyo | 350/96.23 |
| 4,909,592 A | 3/1990 | Arroyo et al. | 350/96.23 |
| 4,913,517 A | 4/1990 | Arroyo et al. | 350/96.23 |
| 4,979,795 A * | 12/1990 | Mascarenhas | 385/107 |
| 5,016,952 A | 5/1991 | Arroyo et al. | 350/96.2 |
| 5,054,880 A | 10/1991 | Bruggendieck | 385/111 |
| 5,109,456 A | 4/1992 | Sano et al. | 385/100 |
| 5,125,063 A * | 6/1992 | Panuska et al. | 385/113 |
| 5,133,034 A | 7/1992 | Arroyo et al. | 385/107 |
| 5,224,190 A | 6/1993 | Chu et al. | 385/107 |
| 5,243,675 A | 9/1993 | Kathiresan et al. | 385/109 |
| 5,377,290 A | 12/1994 | Ohta et al. | 385/100 |
| 5,422,973 A | 6/1995 | Ferguson et al. | 385/112 |
| 5,509,097 A | 4/1996 | Tondi-Resta et al. | 385/113 |
| 5,621,841 A | 4/1997 | Field | 385/113 |
| 5,621,842 A | 4/1997 | Keller | 385/114 |
| 5,630,003 A * | 5/1997 | Arroyo | 385/113 |
| 5,668,912 A * | 9/1997 | Keller | 385/100 |
| 5,684,904 A | 11/1997 | Bringuier et al. | 385/109 |
| 5,689,601 A | 11/1997 | Hager et al. | 385/100 |
| 5,698,615 A | 12/1997 | Polle | 523/173 |
| 5,763,067 A | 6/1998 | Bruggemann et al. | 428/317.9 |
| 5,838,863 A | 11/1998 | Fujiura et al. | 385/103 |
| 6,087,000 A | 7/2000 | Girgis et al. | 428/392 |
| 6,091,871 A | 7/2000 | Elisson et al. | 385/113 |
| 6,122,424 A | 9/2000 | Bringuier | 385/100 |
| 6,178,278 B1 * | 1/2001 | Keller et al. | 385/109 |
| 6,226,431 B1 | 5/2001 | Brown et al. | 385/114 |
| 6,229,944 B1 | 5/2001 | Yokokawa et al. | 385/114 |
| 6,278,826 B1 | 8/2001 | Sheu | 385/109 |
| 6,314,224 B1 * | 11/2001 | Stevens et al. | 385/113 |
| 6,321,012 B1 | 11/2001 | Shen | 385/106 |
| 6,377,738 B1 * | 4/2002 | Anderson et al. | 385/113 |
| 6,389,204 B1 | 5/2002 | Hurley | 385/102 |
| 6,463,199 B1 | 10/2002 | Quinn et al. | 385/109 |
| 6,504,979 B1 | 1/2003 | Norris et al. | 385/109 |
| 6,574,400 B1 | 6/2003 | Lail | 385/109 |
| 6,586,094 B1 | 7/2003 | Rebouillat et al. | 428/372 |
| 6,618,526 B2 * | 9/2003 | Jackman et al. | 385/102 |
| 6,654,527 B2 | 11/2003 | Sakabe et al. | 385/114 |
| 6,711,329 B2 | 3/2004 | Zelesnik | 385/100 |
| 6,714,708 B2 * | 3/2004 | McAlpine et al. | 385/100 |
| 6,728,451 B2 * | 4/2004 | Kordahi | 385/100 |
| 6,749,446 B2 * | 6/2004 | Nechitailo | 439/114 |
| 6,847,768 B2 * | 1/2005 | Lail et al. | 385/111 |
| 2002/0009272 A1 | 1/2002 | Parris | 385/109 |
| 2003/0044137 A1 | 3/2003 | Lopez | 385/113 |
| 2003/0068147 A1 | 4/2003 | Nechitailo | 385/114 |
| 2004/0156603 A1 | 8/2004 | Schneider et al. | 385/102 |

FOREIGN PATENT DOCUMENTS

| | | |
|---|---|---|
| DE | 2445532 | 1/1976 |
| DE | 2743260 | 4/1979 |
| DE | 2944997 | 11/1979 |
| DE | 3444500 A1 | 11/1985 |
| DE | 19713063 A1 | 10/1998 |
| DE | 10129772 A1 | 1/2003 |
| EP | 0022036 A1 | 1/1981 |
| EP | 0577233 A1 | 1/1994 |
| EP | 0916980 A1 | 5/1999 |
| EP | 1087247 | 4/2000 |
| EP | 1065545 A1 | 1/2001 |
| EP | 1170614 A1 | 1/2002 |
| EP | 1302796 A1 | 4/2003 |
| GB | 2159291 A | 11/1985 |
| GB | 2189071 A | 10/1987 |
| JP | 60-087307 | 5/1985 |
| JP | 61-023104 | 1/1986 |
| JP | 09-152535 | 11/1995 |
| JP | 11-271581 A | 10/1999 |
| JP | 11-337783 A | 12/1999 |
| JP | 2001-343565 A | 12/2001 |
| JP | 2001-343566 A | 12/2001 |
| JP | 2002-236241 | 8/2002 |
| WO | WO02/099491 A1 | 12/2002 |

OTHER PUBLICATIONS

Van Vickle, P., et al., "Innovative Dry Buffer Tube Design for Central Tube Ribbon Cable", Proc. Of the 2001 National Fiber Optics Engineers Conference, p. 154-161 (2001).

Taylor, C., et al., "Effect of Water Blocking Materials On Moisture Diffusion in Prototype Cable Structures", Proc. of the 50th Intern. Wire & Cable Symposium, p. 518-525 (2001).

Dixon, L., et al., "Crush and Bending Resistance in Next Generation Cable Designs", Proc. Of the 50th Intern. Wire & Cable Symposium, p. 422-431 (2001).

Wagman, R., et al., "BOTDR Analysis of Cable Tensile Testing", Proc. Of the 48th Intern. Wire & Cable Symposium, p. 658-664 (1999).

Beasley, B., "Look, Mom! No Gel!" Outside Plant Magazine. Dec. 2002. p. 16-18.

Geca-Tapes, Non-Woven Wrapping-Tapes Catalog "Foam Tapes", Apr. 1996.

Geca-Tapes, Waterblocking Tapes Catalog—"Waterblocking Foam Tapes", Apr. 1996.

Dow Plastics, "Resin For Pipe Extrusion and Pipe Fittings", Apr. 7, 2003.

Okada et al., proceedings of the 49th International Wire and Cable Symposium "Development of New Dry Tube with Water Blocking Laminated Tape", Nov. 2000.

Chung, Su-Vun, "Macrobend Loss of 1300nm Optimized Single Mode Fibre" at 1550 nm, International Wire & Cable Symposium Proceedings 1988. pp. 704-709.

\* cited by examiner

FIBER OPTIC CABLE HAVING A DRY INSERT AND METHODS OF MAKING THE SAME

RELATED APPLICATIONS

The present application is a Continuation-In-Part (CIP) of U.S. Ser. No. 10/862,541 filed on Jun. 7, 2004 now U.S. Pat. No. 7,177,507, which is a Continuation-In-Part of U.S. Ser. No. 10/847,807 filed on May 18, 2004, which is a Continuation-In-Part of U.S. Ser. No. 10/661,204 filed on Sep. 12, 2003, which is a Continuation-In-Part of U.S. Ser. No. 10/326,022 filed on Dec. 19, 2002 now U.S. Pat. No. 6,970,629, the disclosures of which are incorporated herein in their entirety by reference.

FIELD OF THE INVENTION

The present invention relates generally to dry packaging of optical waveguides. More specifically, the invention relates to optical assemblies for communication systems that include at least one dry insert for protecting at least one optical waveguide.

BACKGROUND OF THE INVENTION

Fiber optic cables include optical waveguides such as optical fibers that transmit optical signals, for example, voice, video, and/or data information. One type of fiber optic cable configuration includes an optical waveguide disposed within a tube, thereby forming a tube assembly. Generally speaking, the tube protects the optical waveguide; however, the optical waveguide must be further protected within the tube. For instance, the optical waveguide should have some relative movement between the optical waveguide and the tube to accommodate bending. On the other hand, the optical waveguide should be adequately coupled with the tube, thereby inhibiting the optical waveguide from being displaced within the tube when, for example, pulling forces are applied to install the cable. Additionally, the tube assembly should inhibit the migration of water therein. Moreover, the tube assembly should be able to operate over a range of temperatures without undue optical performance degradation.

Conventional optical tube assemblies meet these requirements by filling the tube with a thixotropic material such as grease. Thixotropic materials generally allow for adequate movement between the optical waveguide and the tube, cushioning, and coupling of the optical waveguide. Additionally, thixotropic materials are effective for blocking the migration of water within the tube. However, the thixotropic material must be cleaned from the optical waveguide before connectorization of the same. Cleaning the thixotropic material from the optical waveguide is a messy and time-consuming process. Moreover, the viscosity of thixotropic materials is generally temperature dependent. Due to changing viscosity, the thixotropic materials can drip from an end of the tube at relatively high temperatures and the thixotropic materials may cause optical attenuation at relatively low temperatures.

Cable designs have attempted to eliminate thixotropic materials from the tube, but the designs are generally inadequate because they do not meet all of the requirements and/or are expensive to manufacture. One example that eliminates the thixotropic material from the tube is U.S. Pat. No. 4,909,592, which discloses a tube having conventional water-swellable tapes and/or yarns disposed therein. For instance, conventional water-swellable tapes are typically formed from two thin non-woven layers that sandwich a water-swellable powder therebetween, thereby forming a relatively thin tape that does not fill the space inside a buffer tube. Consequently, conventional water-swellable tapes do not provide adequate coupling for the optical waveguides because of the unfilled space. Additionally, the space allows water within the tube to migrate along the tube, rather than be contained by the conventional water-swellable tape. Thus, this design requires a large number of water-swellable components within the tube for adequately coupling the optical fibers with the tube. Moreover, the use of large numbers of water-swellable components inside a buffer tube is not economical because it increases the manufacturing complexity along with the cost of the cable.

Another example that eliminates the thixotropic material from a fiber optic cable is U.S. Pat. No. 6,278,826, which discloses a foam having a moisture content greater than zero that is loaded with super-absorbent polymers. The moisture content of the foam is described as improving the flame-retardant characteristics of the foam. Likewise, the foam of this design is relatively expensive and increases the cost of the cable.

DETAILED DESCRIPTION OF THE INVENTION

The present invention will now be described more fully hereinafter with reference to the accompanying drawings showing preferred embodiments of the invention. The invention may, however, be embodied in many different forms and should not be construed as limited to the embodiments set forth herein; rather, these embodiments are provided so that the disclosure will fully convey the scope of the invention to those skilled in the art. The drawings are not necessarily drawn to scale but are configured to clearly illustrate the invention.

Figure 1:
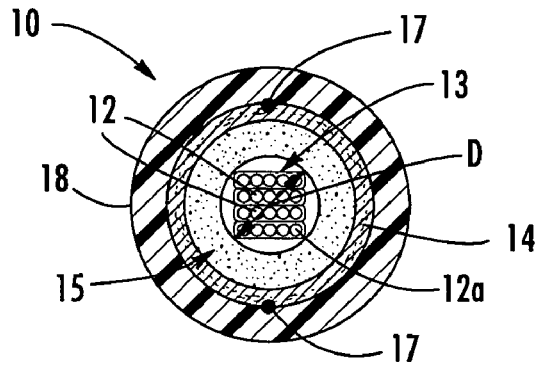
FIG. 1 is a cross-sectional view of a tube assembly according to the present invention.
Figure 1A:
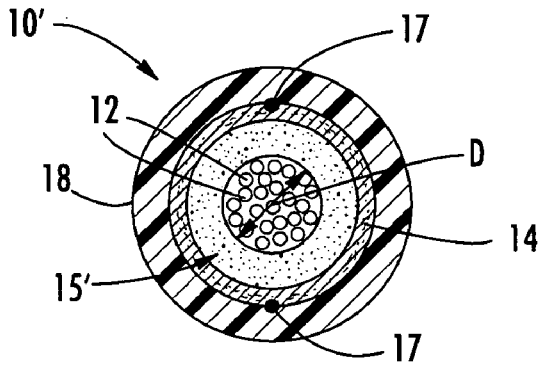
FIG. 1a is a cross-sectional view of another tube assembly according to the present invention.
Figure 5:
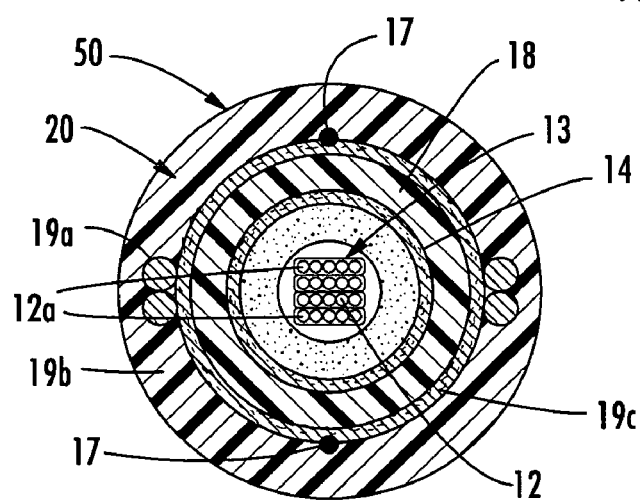
FIG. 5 is a cross-sectional view of a fiber optic cable according to one embodiment of the present invention.

Illustrated in FIG. 1 is an exemplary tube assembly 10 according to one aspect of the present invention. Tube assembly 10 includes at least one optical waveguide 12 such as an optical fiber, at least one dry insert 14, and a tube 18. In this case, the at least one optical waveguide 12 is in the form of a stack of ribbons 13 having a diagonal D dimension across the corners of the stack. Dry insert 14 generally surrounds the at least one optical waveguide 12 and forms core 15, which is disposed within tube 18. Dry insert 14 performs functions such as cushioning, coupling, inhibiting the migration of water, and accommodates bending. Dry insert 14 is advantageous because the optical waveguides are easily removed therefrom without leaving a residue or film that requires cleaning before connectorization. Moreover, unlike conventional thixotropic materials, dry insert 14 does not change viscosity with temperature variations or have a propensity to drip from an end of the tube at high temperatures. Furthermore, tube assembly 10 can include other suitable components such as a polyester binder thread 17 to hold dry insert 14 about optical waveguide 12. Likewise, two or more threads may be stitched together for holding dry insert 14 together before extruding tube 18 therearound. FIG. 1a shows tube assembly 10', which is a variation of tube assembly 10. Specifically, tube assembly 10' includes a plurality of loose optical waveguides 12, instead of the stack of ribbons 13. In this case, tube assembly 10' includes twenty-four loose optical waveguides 12 having diagonal dimension D, but any suitable number of optical waveguides may be used. Moreover, optical waveguides 12 may be bundled into one or more groups using binders, water-swellable threads, tapes, wraps, or other suitable materials. Additionally, tube assemblies 10 or 10' can be a portion of cable as shown in FIG. 5. Furthermore, dry inserts 14 according to the present invention may be used with tubeless cable designs.

As depicted, optical waveguide 12 is an optical fiber that forms a portion of an optical fiber ribbon. In this case, the optical waveguides are a plurality of single-mode optical fibers in a ribbon format that form ribbon stack 13. Ribbon stack 13 can include helical or S-Z stranding. Additionally, other types or configurations of optical waveguides can be used. For example, optical waveguide 12 can be multi-mode, pure-mode, erbium doped, polarization-maintaining fiber, other suitable types of optical waveguides, and/or combinations thereof. Moreover, optical waveguide 12 can be loose or in bundles. Each optical waveguide 12 may include a silica-based core that is operative to transmit optical signals and is surrounded by a silica-based cladding having a lower index of refraction than the core. Additionally, one or more coatings can be applied to optical waveguide 12. For example, a soft primary coating surrounds the cladding, and a relatively rigid secondary coating surrounds the primary coating. In one embodiment, one or more optical waveguides 12 include a coating system as disclosed in U.S. patent application Ser. No. 10/632,219 filed on Jul. 18, 2003, the disclosure of which is incorporated herein by reference. Optical waveguide 12 can also include an identifying means such as ink or other suitable indicia for identification. Of course, optical waveguide can also include a tight buffer layer. Suitable optical fibers are commercially available from Corning Incorporated of Corning, N.Y.

In other embodiments, ribbon stack 13 can have a corner optical waveguide(s) 12a with a predetermined MAC number, thereby inhibiting optical attenuation of the corner optical waveguide when subjected to compressive forces. Stated another way, selecting corner optical waveguides with a predetermined MAC number places optical waveguides that are less sensitive to optical attenuation from compressive forces in ribbon stack locations that experience relatively high levels of compression. In other embodiments, all of the optical waveguides 12 of the ribbons may have a predetermined MAC number. As used herein, MAC number is calculated as a mode field diameter (MFD) divided by a cutoff wavelength for the given optical waveguide 12a where both quantities are expressed in micrometers so that the MAC number is dimensionless. In other words, MFD is typically expressed in micrometers and cutoff wavelength is typically expressed in nanometers, so the cutoff wavelength must be divided by 1000 to convert it to micrometers, thereby yielding a dimensionless MAC number.

By way of example, the MAC number is about 7.35 or less, more preferably about 7.00 or less, and most preferably about 6.85 or less; however, there is a lower limit on the MAC number. By way of example, corner optical waveguide(s) 12a is selected with a MFD of 9.11 μm or less and a cutoff wavelength of 1240 nm or more, thereby yielding 7.35 or less for the MAC number. Generally speaking, the MAC number is directly proportional to MFD and inversely proportional to the cutoff wavelength. Ribbon stack 13 has four corner optical waveguides 12a; however, other ribbon stack configurations can include more corner positions. For instance, a ribbon stack having a generally plus sign shape includes eight outer corners. Likewise, other ribbon stack configurations may have other numbers of corner positions.

Additionally, ribbon embodiments of the present invention may have a positive excess ribbon length (ERL), although a negative ERL may be possible with some cable designs, but generally speaking performance may be affected. As used herein, ERL is defined as the length of the particular ribbon minus the length of the tube or cable containing the ribbon divided by the length of the tube or cable containing the ribbon, which can be expressed as a percentage by multiplying by 100. Whether the ERL is calculated using the tube length or the cable length depends on the particular configuration. Moreover, individual ribbons of a cable can have different values of ERL. By way of example, ribbons of cable 50 have a positive ERL, such as a positive ERL in the range of about 0.0% to about 0.4% or greater, but other suitable values may be possible. Likewise, embodiments having loose or bundled optical fibers may include a positive excess fiber length (EFL) within a suitable range for the cable configuration.

Figure 2:
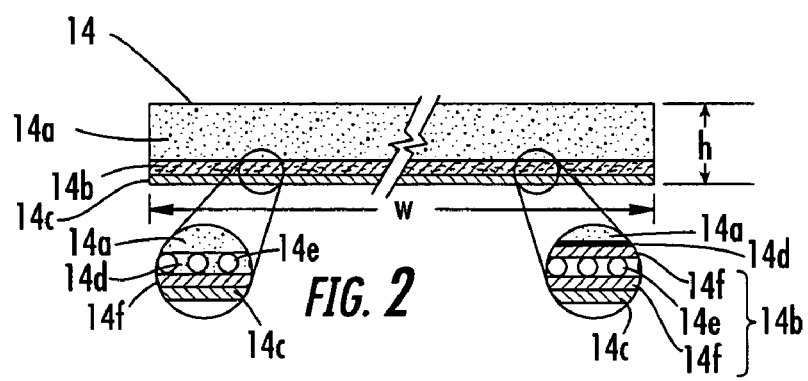
FIG. 2 is a cross-sectional view of the dry insert of the tube assembly of FIG. 1.

FIG. 2 illustrates a cross-sectional view of an explanatory dry insert 14. Dry insert 14 is formed from an elongate material or materials that are capable of being paid off from a reel for a continuous application during manufacture. Dry insert 14 can be formed from a plurality of layers that can perform different functions; however, the dry insert can be a single layer such as a felt material that is compressible and may optionally include a water-blocking/water-swellable feature. Dry insert 14 cushions optical waveguide 12 from tube 18, thereby maintaining optical attenuation of optical waveguide 12 below about 0.4 dB/km at a reference wavelength of 1310 nm and 0.3 dB/km at a reference wavelengths of 1550 nm and 1625 nm. But other suitable optical attenuation values are possible such as 0.35/0.25 for the respective 1310 and 1550 reference wavelengths. In one embodiment, dry insert 14 is formed from two distinct layers. For instance, FIG. 2 depicts a first layer 14a of dry insert 14 that is a compressible layer and second layer 14b that is a water-swellable layer. In this case, first layer 14a is formed from a compressible material having a predetermined spring constant for providing adequate coupling characteristics. By way of example, the first layer is a foam tape such as an open cell foam tape; however, any suitable compressible material can be used such as a closed cell foam tape. As shown in FIG. 2, second layer 14b can have any suitable construction and in preferred embodiments is a suitable water-swellable tape having one or more components. For instance, water-swellable tapes can have different constructions as shown by the two different detail bubbles of FIG. 2, but generally include at least one tape such as a non-woven tape 14f having a plurality of water-swellable particles 14e. However, dry insert 14 can include other types of particles formed from one or more materials.

First layer 14a and second layer 14b are preferably attached together with an adhesive 14d so that a force of about 5 Newtons (N) or more is required to separate the layers. Adhesive 14d can be sprayed onto one or both of the layers during manufacture, thereby creating a fine mist that inhibits clusters of adhesive from forming; however, other suitable application methods are also possible. But, the adhesive may have other forms such as a powder that is applied to one or more layers. Whatever the form of adhesive used, it should not cause elevated levels of attenuation when the dry insert is placed about the optical waveguide. Likewise, water-swellable particles or conglomerate particles such as adhesive and/or water-swellable particles should not cause microbending. In other words, the average particle size of adhesive 14d, or other conglomerate materials such as adhesive and water-swellable powder, should be relatively small such as 600 microns or less, preferably about 450 mircons or less, and most preferably about 300 microns or less so that if the particles press against the optical waveguide through a portion of dry insert 14 they will not cause elevated levels of microbending. As used herein, average particle size refers to particles of one or more materials used in dry insert 14.

As shown in the right detail bubble of FIG. 2, second layer 14b is a water-swellable tape having water-swellable particles 14e disposed between two non-woven tape-like materials 14f that is attached by adhesive 14d to first layer 14a. This construction inhibits particles from causing microbending since there is a non-woven tape that acts as a buffer between first layer 14a and water-swellable particles 14e. The average particle size of the water-swellable powder should be relatively small such as 600 microns or less, preferably about 450 microns or less, and most preferably about 300 microns or less so that if the water-swellable particles press against the optical waveguide through a portion of dry insert 14 they will not cause elevated levels of microbending. Second layer 14b can have other constructions such as shown in the left detail bubble of FIG. 2. Specifically, this embodiment shows water-swellable particles 14e attached to one side of a single non-woven tape 14f, which is then attached to compressible first layer 14a so that water-swellable particles 14e are disposed between the first and second layers without a buffer layer. In this construction adhesive 14f functions to attach water-swellable particles 14e and to attach the first and second layers 14a,14b of dry insert 14 together. However, this construction of dry insert 14 generally leads to a larger average particle size of a conglomerate material formed of adhesive and water-swellable particles. In other words, all things being equal the average particle size in this dry insert construction is generally larger because it creates a conglomerate particle compared with the water-swellable particle alone. Consequently, this may cause elevated microbending if the average particle size becomes too large. So in this construction the average particle size of the conglomerate or composite particle should be in the same range as stated above for inhibiting microbending.

Likewise, the inner surface of dry insert 14 should not cause elevated levels of microbending. Thus, in preferred embodiments, a surface of the layer that can contact the optical waveguides should have a relatively smooth surface. For instance, if foam is used as first layer 14a of dry insert 14 an average cell size of the foam is about 1000 microns or less, and can be about 700 microns or less, thereby creating a relatively smooth surface. Additionally, the foam may have layers with different size cells such as larger cells away from the optical waveguides and smaller cells near the surface of the foam that can contact the optical waveguides. Other variations include a surface treatment for smoothing the surface of the foam layer. Surface treatments include heating to smooth out the surface or filling the cells with a suitable material. Additionally, first layer 14a such as foam cushions the water-swellable particles and/or adhesive of dry insert 14 from causing microbending.

In one embodiment, the first layer is an open cell polyurethane (PU) foam tape. The PU foam tape may either be an ether-based PU or an ester-based PU, but other suitable foam tape compressible layers can be used such as a polyethylene foam, a polypropylene foam, or EVA foam. However, preferred embodiments use an ether-based foam tape since it performs better than an ester-based PU foam when subject to moisture. In other words, the ester-based PU foam can break down with moisture, whereas the ether-based PU foam is generally more robust with respect to moisture. Additionally, the foam layer has a predetermined density generally in the range of about 1 lb/ft$^3$ to about 3 lb/ft$^3$, but in preferred embodiments the density is about 2 lb/ft$^3$. Dry insert 14 also has a predetermined ultimate tensile strength to inhibit breakage during manufacture. Generally speaking, with dry inserts having both a compressible layer and a water-swellable layer the majority of the tensile strength is provided by the water-swellable layer(s). The ultimate tensile strength of the dry insert is preferably about 20 Newtons per centimeter width W of dry insert 14 or greater, more preferably about 30 Newtons per centimeter width W of dry insert 14 or greater.

Dry insert 14 may have a water-swell speed so that the majority of swell height of the water-swellable substance occurs within about 120 seconds or less of being exposed to water, more preferably about 90 seconds or less. By way of example, dry insert 14 may have a maximum swell height of about 18 mm for distilled water and about 8 mm for a 5% ionic water solution i.e., salt water in a unrestricted swell state; however, dry inserts with other suitable maximum swell heights may be used. Tube assemblies may be constructed with a water-swell ratio of about 3 or more, about 5 or more, and up to about 7 or more. Water-swell ratio is defined as the unrestricted cross-sectional swell state area of the dry insert divided by the free space in the tube assembly. For round cables, the free space of the tube assembly is defined as an area of an inner diameter of the tube minus the area that the optical waveguides occupy. For instance, if the dry insert has an unrestricted cross-sectional swell state area of 50 mm² and the tube has a free space of 10 mm² the water-swell ratio is five.

Figure 10:
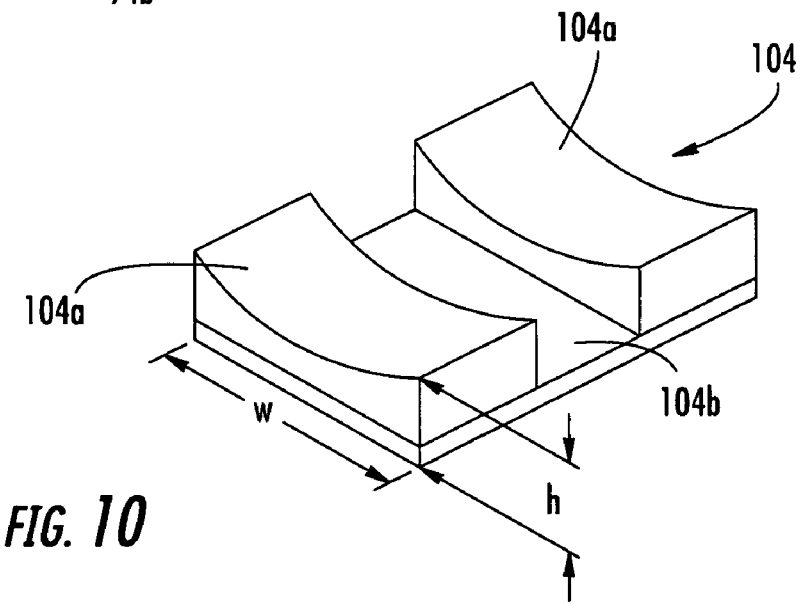
FIG. 10 is a perspective view of another dry insert according to the concepts of the present invention.

Dry insert 14 may be compressed during assembly so that it provides a predetermined normal force that inhibits optical waveguide 12 from being easily displaced longitudinally along tube 18. Dry inserts 14 preferably have an uncompressed height h of about 5 mm or less for minimizing cable size such as the tube diameter and/or cable diameter of a round cable; however, any suitable height h can be used for dry insert 14. Additionally, height h of dry insert 14 need not be constant across the width, but can vary, thereby conforming to the cross-sectional shape of the optical waveguides and providing improved cushioning to improve optical performance (FIG. 10). Second layer 14b is a water-swellable layer such as a tape that inhibits the migration of water within tube 18.

Figure 18:
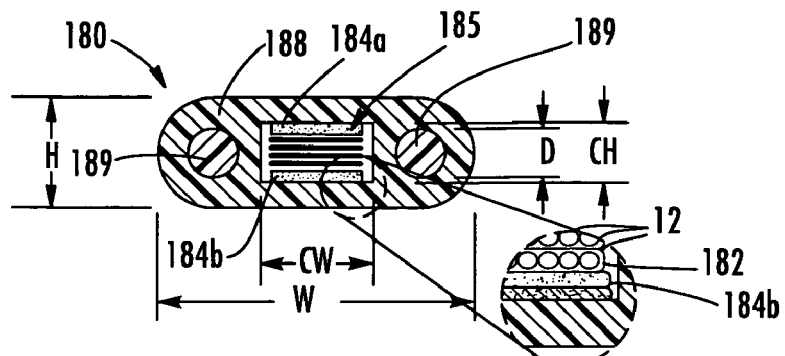
FIGS. 18 and 18a are cross-sectional views of other fiber optic cables according to the present invention.

Compression of dry insert 14 is actually a localized maximum compression of dry insert 14. In the case of FIG. 1, the localized maximum compression of dry insert 14 occurs at the corners of the ribbon stack across the diameter. In other cable designs such as depicted in FIG. 18, the localized maximum compression of the dry insert generally occurs at the maximum amplitude of undulating ribbon stack as will be discussed. Calculating the percentage of compression of dry insert 14 in FIG. 1 requires knowing an inner diameter of tube 18, a diagonal D dimension of the ribbon stack, and an uncompressed height h of dry insert 14. By way of example, inner diameter of tube 18 is 7.1 mm, diagonal D of the ribbon stack is 5.1 mm, and the uncompressed height h of dry insert 14 across a diameter is 3.0 mm (2 times 1.5 mm). Adding diagonal D (5.1 mm) and the uncompressed height h of dry insert 14 across the diameter (3.0 mm) yields an uncompressed dimension of 8.1 mm. When placing the ribbon stack and dry insert 14 and into tube 18 with an inner diameter of 7.1 mm, dry insert is compressed a total of 1 mm (8.1 mm-7.1 mm). Thus, dry insert 14 is compressed by about thirty percent across the diameter of tube 18.

Figure 2A:
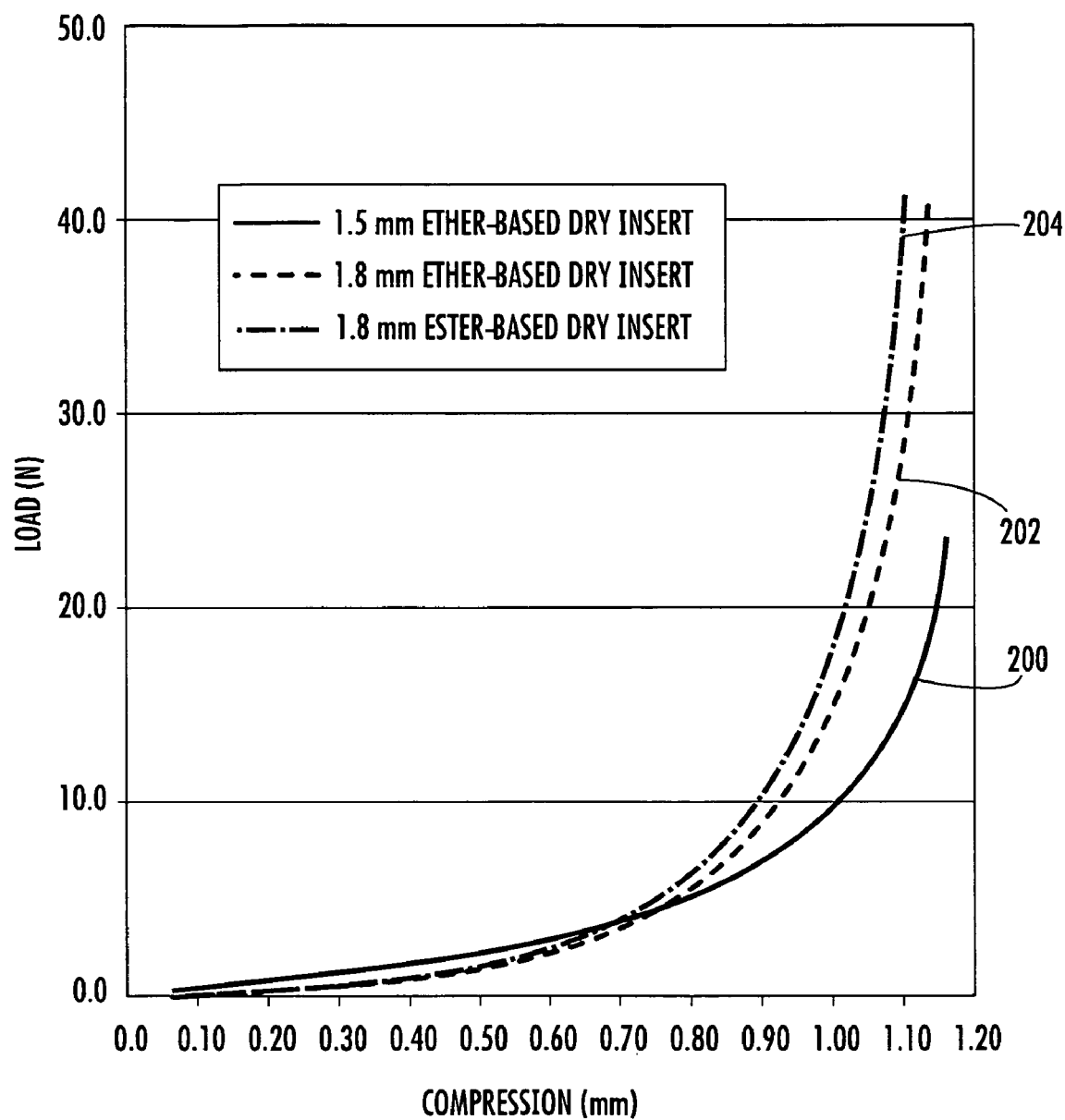
FIG. 2a is a graph depicting compression curves for three different dry inserts.

FIG. 2a is a graph depicting exemplary compression curves 200, 202, and 204 for three different dry inserts 14. Specifically, curves 200 and 202 represent two different dry inserts each having a compressible open cell ether-based PU foam layer and a water-swellable layer. Curves 200 and 202 respectively represent dry inserts with respective heights h of about 1.5 mm and about 1.8 mm. On the other hand, curve 204 represents a dry insert having a compressible open cell ester-based PU foam layer and a water-swellable layer with a height of about 1.8 mm. The compression curves were generated by placing the dry insert sample between two circular plates having a diameter of about 2.2 inches while measuring the force required to compress the sample using an Instron machine.

As shown, the compression curves for all three dry inserts 14 are generally non-linear over the compression range. But generally speaking, compression curves 200, 202, and 204 have a generally linear compression up to about 0.70 mm. In one embodiment, dry insert 14 has compression of about 1.0 mm or less with a force of about 10 Newtons. Generally speaking, the foam layer is being compressed while the water-swellable layer is relatively uncompressible.

In other embodiments, first layer 14a of dry insert 14 is uncompressed in tube assembly 10, but begins to compress if optical waveguide movement is initiated. Other variations include attaching or bonding a portion of dry insert 14 to tube 18. For example, adhesives, glues, elastomers, and/or polymers 14c are disposed on a portion of the surface of dry insert 14 that contacts tube 18 for attaching dry insert 14 to tube 18. For instance, layer 14c is a polymer layer that at least partially melts during the extrusion of tube 18, thereby creating a bond therebetween. Additionally, it is possible to helically wrap dry insert 14 about optical waveguide 12, instead of being longitudinally disposed. In still further embodiments, two or more dry inserts can be formed about one or more optical waveguides 12 such as two halves placed within tube 18.

Figure 2B:
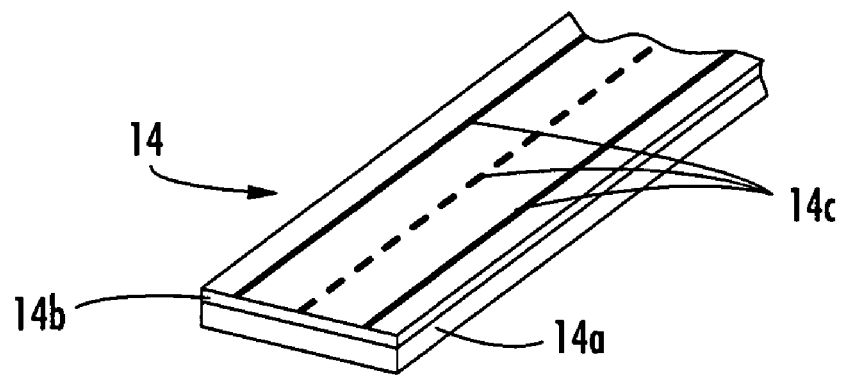
FIGS. 2b-2d depict various configurations of an adhesive/glue application to the dry insert of FIG. 2.
Figure 2C:
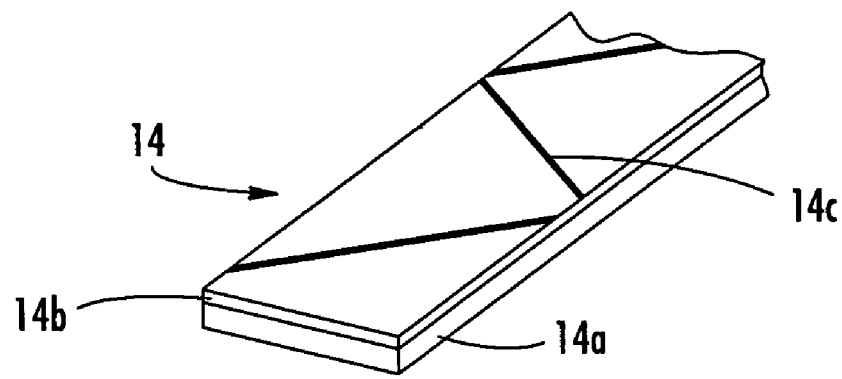
Figure 2D:
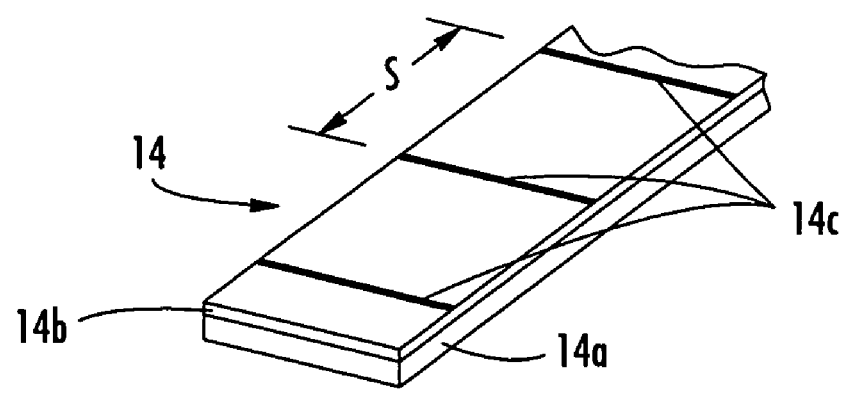

Other embodiments may include a fugitive glue/adhesive is used for coupling cable core 15 and/or dry insert 14 with tube 18. The glue/adhesive or the like is applied to the radially outward surface of dry insert 14, for instance, during the manufacturing process. The fugitive glue/adhesive is applied while hot or melted to the outer surface of dry insert 14 and then is cooled or frozen when the cable is quenched or cools off. By way of example, a suitable fugitive glue is available from National Starch and Chemical Company of Bridgewater, N.J. under the tradename LITE-LOK® 70-003A. The fugitive glue or other suitable adhesive/material may be applied in beads having a continuous or an intermittent configuration as shown in FIGS. 2b-2d. For instance, one or more adhesive/glue beads may be longitudinally applied along the dry insert, longitudinally spaced apart beads, in a zig-zag bead along the longitudinal axis of the dry insert, or in any other suitable configuration.

In one application, a plurality of beads of fugitive glue/adhesive or the like is applied to dry insert 14. For instance, three continuous, or non-continuous, beads can be disposed at locations so that when the dry insert is formed about the ribbon stack the beads are about 120 degrees apart. Likewise, four beads can be disposed at locations so they are about 90 degrees apart when the dry insert is formed about the optical waveguides. In embodiments having the beads spaced apart along the longitudinal axis, the beads may have a longitudinal spacing S of about 20 mm and about 800 mm or more; however, other suitable spacing may be used. Additionally, beads may be intermittently applied for minimizing the amount of material required, thereby reducing manufacturing expense while still providing sufficient coupling/adhesion.

Since tube assemblies 10 are not filled with a thixotropic material the tube may deform or collapse, thereby forming an oval shaped tube instead of a round tube. U.S. patent application Ser. No. 10/448,509 filed on May 30, 2003, the disclosure of which is incorporated herein by reference, discusses dry tube assemblies where the tube is formed from a bimodal polymeric material having a predetermined average ovality. As used herein, ovality is the difference between a major diameter D1 and a minor diameter D2 of tube 18 divided by major diameter D1 and multiplied by a factor of one-hundred, thereby expressing ovality as a percentage. Bimodal polymeric materials include materials having at least a first polymer material having a relatively high molecular weight and a second polymer material having a relatively low molecular weight that are manufactured in a dual reactor process. This dual reactor process provides the desired material properties and should not be confused with simple post reactor polymer blends that compromise the properties of both resins in the blend. In one embodiment, the tube has an average ovality of about 10 percent or less. By way of example, tube 18 is formed from a HDPE available from the Dow Chemical Company of Midland, Mich., under the tradename DGDA-2490 NT.

Figure 3:
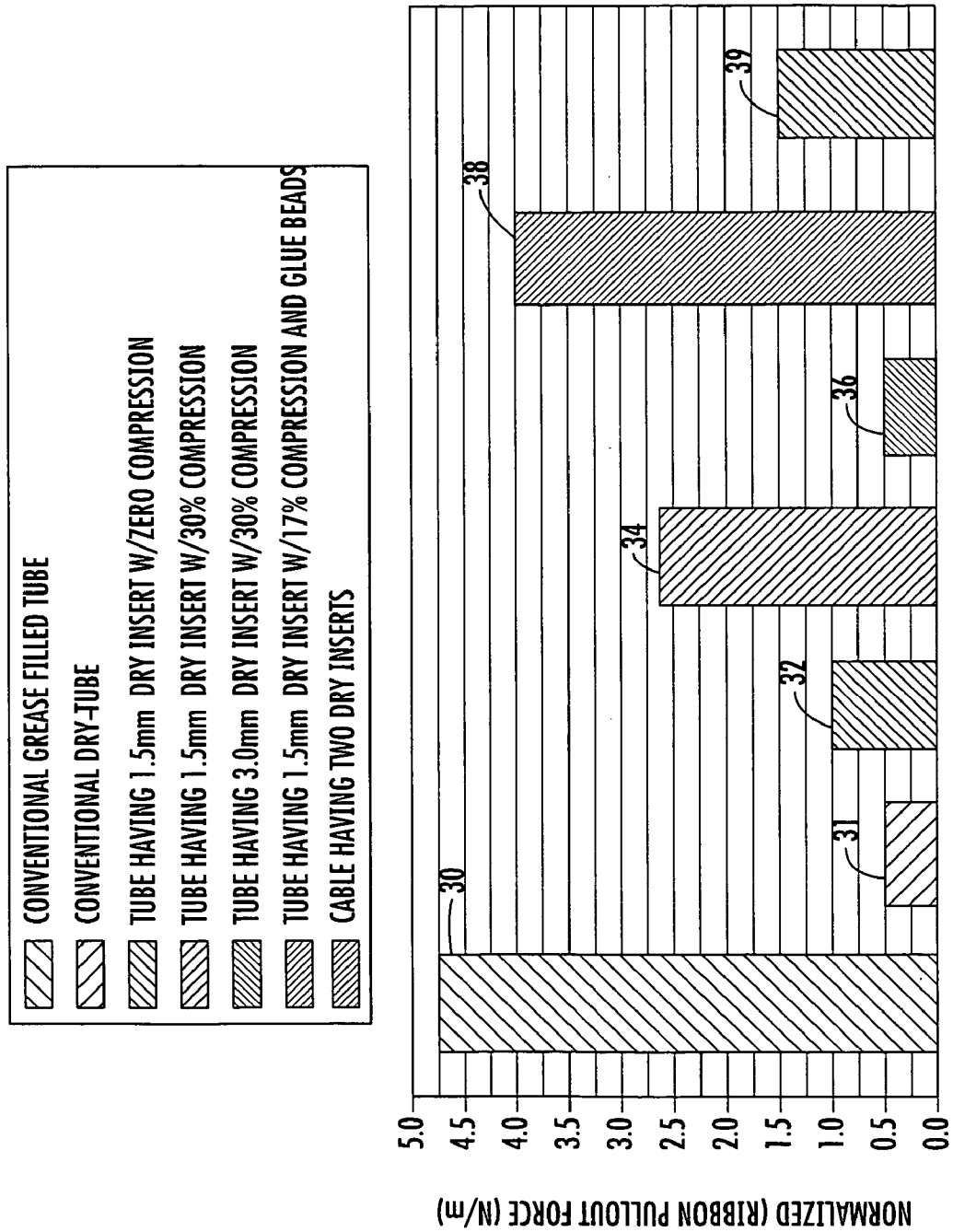
FIG. 3 is a bar graph depicting an optical ribbon pullout force for various tube configurations.
Figure 11:
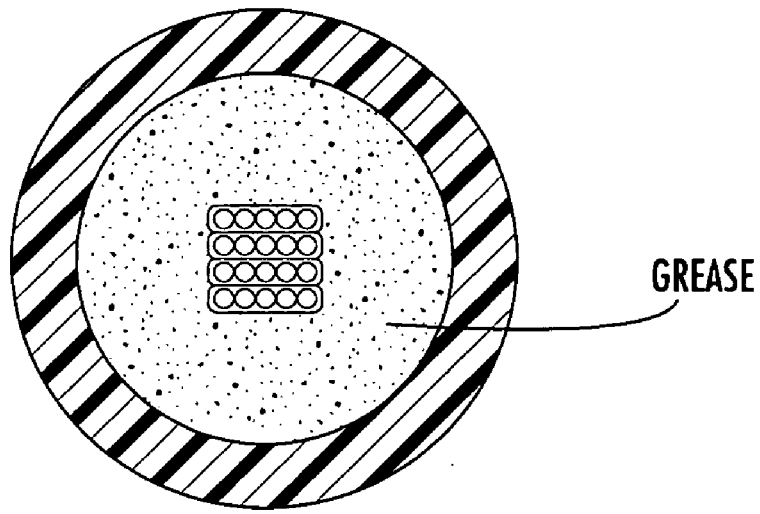
FIG. 11 is a cross-sectional view of a cable having a conventional grease filled tube assembly.
Figure 12:
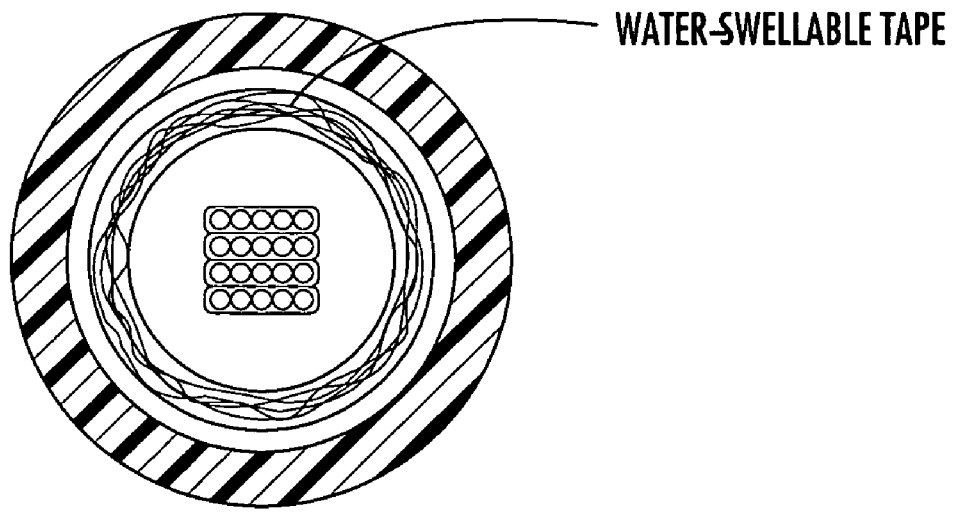
FIG. 12 is a cross-sectional view of a cable having a conventional dry tube assembly.

FIG. 3 is a bar graph depicting a normalized optical ribbon pullout force (N/m) for various tube and/or cable configurations. The ribbon pullout force test measured the force required to initiate movement of a ribbon stack along its entire length from a 10-meter length of cable. Of course, this pullout force test is equally applicable to loose or bundled optical waveguides. Specifically, the stack of ribbons was pulled from the tube and the force required to initiate movement of the entire length of ribbons was divided by the length of the cable, thereby normalizing the optical ribbon pullout force. As a baseline for comparison, bar 30 depicts a ribbon pullout force of about 4.8 N/m for a ribbon stack of 120-fibers in conventional grease (a thixotropic material) filled tube (FIG. 11). Bar 31 depicts a ribbon pullout force for a conventional dry tube design solely having a water-swellable tape around a ribbon stack of 144-fibers (similar to FIG. 12), which are loosely disposed in a tube. Specifically, bar 31 depicts a ribbon pullout force of about 0.6 N/m for the 144-fiber ribbon stack. Thus, the conventional dry tube design (FIG. 12) has a ribbon pullout force that is about twelve percent of the ribbon pullout force of the conventional grease filled tube (FIG. 11), which is inadequate for proper cable performance.

Bars 32, 34, 36, and 38 represent tube assemblies according to the present invention and bar 39 represents cable 180 depicted in FIG. 18. Specifically, bar 32 depicts a ribbon pullout force of a 144-fiber stack from a tube assembly 10 having dry insert 14 with an uncompressed height h of about 1.5 mm with about a zero percent compression of dry insert 14. In this embodiment, bar 32 depicts a ribbon pullout force of about 1.0 N/m, which is a surprising improvement over the conventional dry tube. Bars 34 and 36 represent configurations where dry insert 14 is compressed within tube assembly 10 by a percentage from its original height to an average compressed height. More specifically, bar 34 represents a ribbon pullout force of a similar tube assembly as bar 32, expect that in this embodiment dry insert 14 is compressed about thirty percent. In this embodiment, bar 34 depicts a ribbon pullout force of about 2.7 N/m. Bar 36 represents a ribbon pullout force of a 144-fiber ribbon stack from a tube assembly with dry insert 14 having an uncompressed height h of about 3 mm, which is compressed by about thirty percent within the tube. In this embodiment, bar 36 depicts a ribbon pullout force of about 0.5 N/m. Bar 38 represents a ribbon pullout force of a 144-fiber stack from a tube assembly 10 having dry insert 14 with an uncompressed height h of about 1.5 mm with about a seventeen percent compression of dry insert 14 and glue beads. In this case, four glue beads were continuously applied longitudinally along the dry insert so that they were spaced at about 90 degrees. The ribbon pullout force for this embodiment was about 4.0 N/m. As shown, the application of adhesive/glue beads increased the ribbon pullout force with less compression of the dry insert. Thus, according to the concepts of the present invention the compression of dry insert 14 may be in the range of about 10% to about 90%; however, other suitable ranges of compression or even no compression may provide the desired performance depending on the configuration. Nonetheless, the compression of dry insert 14 should not be so great as to cause undue optical attenuation in any of the optical waveguides and can be increased with the use of adhesive/glue beads. Bar 39 depicts a ribbon pullout force of about 1.5 N/m for a 96 fiber four ribbon stack from a cable jacket 188 of cable 180 as discussed in more detail below. Preferably, the ribbon pullout force, or pullout force for other optical waveguide configurations, is in the range of about 0.5 N/m and about 5.0 N/m, more preferably, in the range of about 1 N/m to about 4 N/m.

Figure 4:
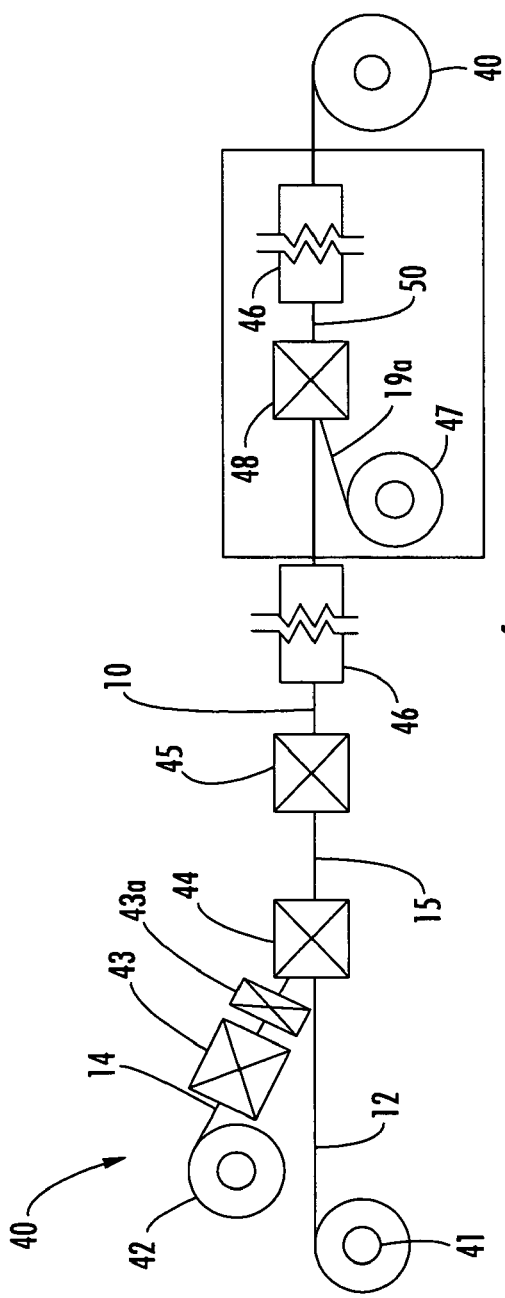
FIG. 4 is a schematic representation of a manufacturing line according to the present invention.

FIG. 4 schematically illustrates an exemplary manufacturing line 40 for tube assembly 10 according to the present invention; however, other variations of the concepts may be used to manufacture other assemblies and/or cables according to the concepts of the present invention. Manufacturing line 40 includes at least one optical waveguide payoff reel 41, a dry insert payoff reel 42, an optional compression station 43, an glue/adhesive station 43a, a binding station 44, a cross-head extruder 45, a water trough 46, and a take-up reel 49. Additionally, tube assembly 10 may have a sheath 20 therearound, thereby forming a cable 50 as illustrated in FIG. 5. Sheath 20 can include strength members 19a and a jacket 19b, which can be manufactured on the same line as tube assembly 10 or on a second manufacturing line. The exemplary manufacturing process includes paying-off at least one optical waveguide 12 and dry insert 14 from respective reels 41 and 42. Only one payoff reel for optical waveguide 12 and dry insert 14 are shown for clarity; however, the manufacturing line can include any suitable number of payoff reels to manufacture tube assemblies and cables according to the present invention. Next, dry insert 14 is compressed to a predetermined height h at compression station 43 and an optional adhesive/glue is applied to the outer surface of dry insert 14 at station 43a. Then dry insert 14 is generally positioned about optical waveguide 12 and if desired binding station wraps or sews one or more binding threads around dry insert 14, thereby forming core 15. Thereafter, core 15 is feed into cross-head extruder 45 where tube 18 is extruded about core 15, thereby forming tube assembly 10. Tube 18 is then quenched in water trough 46 and then tube assembly 10 is wound onto take-up reel 49. As depicted in the box, if one manufacturing line is set-up to make cable 50, then strength members 19a are paid-off reel 47 and positioned adjacent to tube 18, and jacket 19b is extruded about strength members 19a and tube 18 using cross-head extruder 48. Thereafter, cable 50 passes into a second water trough 46 before being wound-up on take-up reel 49. Additionally, other cables and/or manufacturing lines according to the concepts of the present invention are possible. For instance, cables and/or manufacturing lines may include a water-swellable tape 19c and/or an armor between tube 18 and strength members 19a; however, the use of other suitable cable components are possible.

Figure 6:
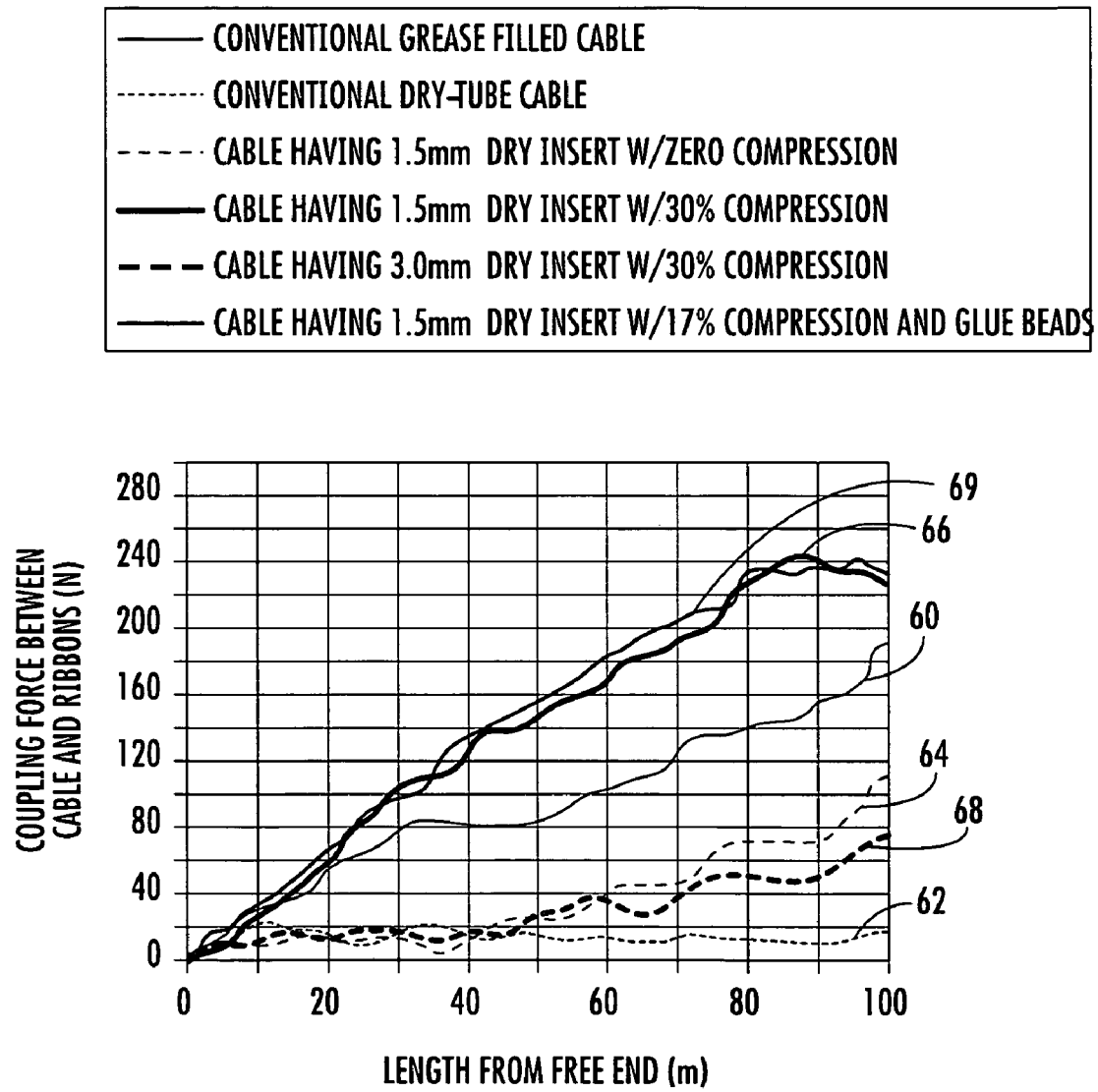
FIG. 6 is a graph depicting an optical ribbon coupling force associated with various cable configurations.

FIG. 6 is a graph depicting the results of a ribbon coupling force for cables having the similar tube assemblies as used in FIG. 3. The ribbon coupling force test is used for modeling the forces applied to the optical waveguide(s) when subjecting a cable to, for example, pulling during installation of the cable. Although the results between the ribbon pullout force and the ribbon coupling force may have forces in the same general range, the ribbon coupling force is generally a better indicator of actual cable performance.

In this case, the ribbon coupling test simulates an underground cable installation in a duct by applying 600 pounds of tension on a 250 m length of cable by placing pulling sheaves on the respective sheathes of the cable ends. However, other suitable loads, lengths, and/or installation configurations can be used for characterizing ribbon coupling in other simulations. Then, the force on the optical waveguide(s) along its length is measured from the end of cable. The force on the optical waveguide(s) is measured using a Brillouin Optical Time-Domain Reflectometer (BOTDR). Determining a best-fit slope of the curve normalizes the ribbon coupling force.

As a baseline for comparison, curve 60 depicts a normalized ribbon coupling force of about 1.75 N/m for a cable having a ribbon stack of 120-fibers in conventional grease filled cable (FIG. 11). Curve 62 depicts a ribbon pullout force for a cable having a conventional dry tube design having a water-swellable tape around a ribbon stack of 144-fibers (FIG. 12), which are loosely disposed in a tube. Specifically, curve 62 depicts a normalized ribbon coupling force of about 0.15 N/m for the 144-fiber ribbon stack. Thus, the conventional dry tube design (FIG. 12) has a normalized ribbon coupling force that is about nine percent of the normalized ribbon coupling force of the conventional grease filled tube (FIG. 11), which is inadequate for proper cable performance. In other words, the ribbon stack of the conventional dry tube cable is easily displacable during stretching of the cable sheath, for example, during aerial ice loading, aerial galloping, cable dig-ups, and pulling during installation of the cable.

Curves 64, 66, 68, and 69 represent cables according to the present invention. Specifically, curve 64 depicts a ribbon coupling force of a cable having a 144-fiber stack with a tube assembly 10 having dry insert 14 with an uncompressed height h of about 1.5 mm with about a zero percent compression of dry insert 14. In this embodiment, curve 64 depicts a ribbon coupling force of about 0.80 N/m, which is an improvement over the conventional dry cable of FIG. 12. Curves 66 and 68 represent cable configurations where dry insert 14 is compressed within tube assembly 10 by a percentage from its original height to an average compressed height. More specifically, curve 66 represents a ribbon coupling force of a similar cable as curve 64, expect that in this embodiment dry insert 14 is compressed about thirty percent. In this embodiment, curve 66 depicts a ribbon coupling force of about 2.80 N/m. Curve 68 represents a ribbon coupling force of a cable having a 144-fiber ribbon stack from a cable having a tube assembly with dry insert 14 having an uncompressed height h of about 3 mm, which is compressed by about thirty percent within the tube. In this embodiment, curve 68 depicts a ribbon coupling force of about 0.75 N/m. Curve 69 represents a ribbon coupling force of a cable having a 144-fiber ribbon stack from a cable having a tube assembly with dry insert 14 having an uncompressed height h of about 1.5 mm, which is compressed by about seventeen percent within the tube and includes adhesive/glue beads. In this case, four glue beads were continuously applied longitudinally along the dry insert so that they were spaced at about 90 degrees. As shown, curve 69 depicts a ribbon coupling force that is similar to curve 66, about 2.80 N/m, with less compression of the dry insert. Thus, according to the concepts of the present invention the ribbon coupling force is preferably in the range of about 0.5 N/m to about 5.0 N/m, more preferably, in the range of about 1 N/m to about 4 N/m. However, other suitable ranges of ribbon coupling force may provide the desired performance.

Figure 7:
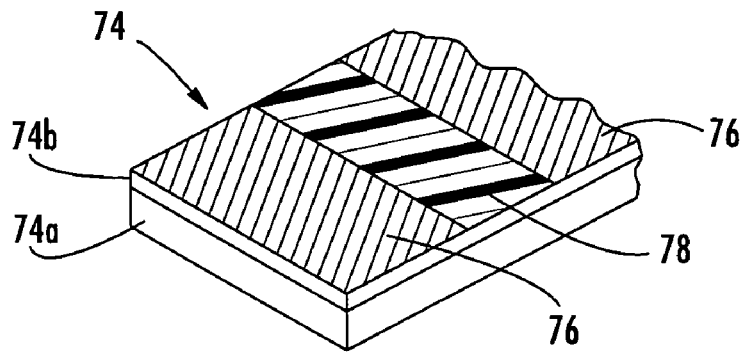
FIG. 7 is a perspective view of another dry insert according to the concepts of the present invention.

Additionally, the concepts of the present invention can be employed with other configurations of the dry insert. As depicted in FIG. 7, dry insert 74 has a first layer 74a and a second layer 74b that includes different suitable types of water-swellable substances. In one embodiment, two different water-swellable substances are disposed in, or on, second layer 14b so that tube assembly 10 is useful for multiple environments and/or has improved water-blocking performance. For instance, second layer 14b can include a first water-swellable component 76 effective for ionized liquids such as saltwater and a second water-swellable component 78 effective for non-ionized liquids. By way of example, first water-swellable material is a polyacrylamide and second water-swellable material is a polyacrylate superabsorbent. Moreover, first and second water-swellable components 76,78 can occupy predetermined sections of the water-swellable tape. By alternating the water-swellable materials, the tape is useful for standard applications, salt-water applications, or both. Other variations of different water-swellable substances include having a water-swellable substance with different swell speeds, gel strengths and/or adhesion with the tape.

Figure 8:
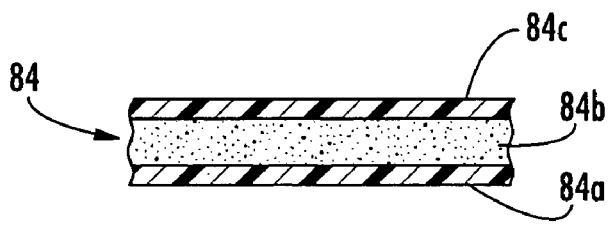
FIG. 8 is a cross-sectional view of another dry insert according to the concepts of the present invention.

FIG. 8 depicts another embodiment of the dry insert. Dry insert 84 is formed from three layers. Layers 84a and 84c are water-swellable layers that sandwich a layer 84b that is compressible for providing a coupling force to the at least one optical waveguide. Likewise, other embodiments of the dry insert can include other variations such at least two compressible layers sandwiching a water-swellable layer. The two compressible layers can have different spring constants for tailoring the normal force applied to the at least optical waveguide.

Figure 9:
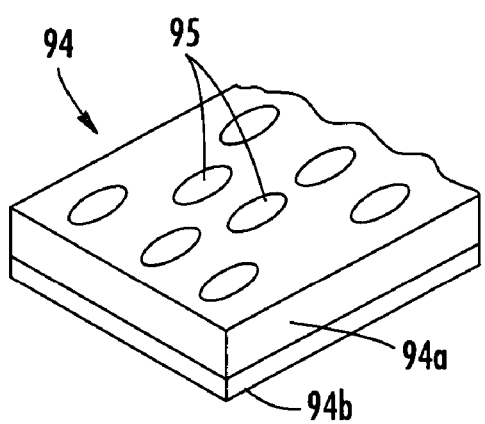
FIG. 9 is a perspective view of another dry insert according to the concepts of the present invention.

FIG. 9 illustrates a dry insert 94 having layers 94a and 94b according to another embodiment of the present invention. Layer 94a is formed from a closed-cell foam having at least one perforation 95 therethrough and layer 94b includes at least one water-swellable substance; however, other suitable materials can be used for the compressible layer. The closed-cell foam acts as a passive water-blocking material that inhibits water from migrating therealong and perforation 95 allows an activated water-swellable substance of layer 94b to migrate radially inward towards the optical waveguide. Any suitable size, shape, and/or pattern of perforation 95 that allows the activated water-swellable substance to migrate radially inward to effectively block water is permissible. The size, shape, and/or pattern of perforations can be selected and arranged about the corner optical waveguides of the stack, thereby improving corner optical waveguide performance. For example, perforations 95 can provide variation in dry insert compressibility, thereby tailoring the normal force on the optical waveguides for maintaining optical performance.

FIG. 10 depicts dry insert 104, which illustrates other concepts of the present invention. Dry insert 104 includes layers 104a and 104b. Layer 104a is formed of a plurality of non-continuous compressible elements that are disposed on layer 104b, which is a continuous water-swellable layer. In one embodiment, the elements of layer 104a are disposed at regular intervals that generally correlate with the lay length of a ribbon stack. Additionally, the elements have a height h that varies across their width w. Stated another way, the elements are shaped to conform to the shape of the optical waveguides they are intended to generally surround.

Figure 13:
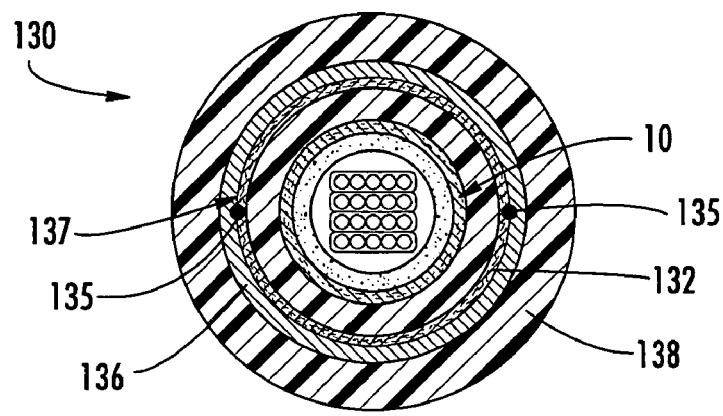
FIG. 13 is a cross-sectional view of a fiber optic cable with an armor layer according to the present invention.

FIG. 13 depicts cable 130, which is another embodiment of the present invention that employs tube assembly 10.

Cable 130 includes a sheath system 137 about tube assembly 10 for protecting tube assembly 10 from, for instance, crushing forces and environmental effects. In this case, sheath system 137 includes a water-swellable tape 132 that is secured by a binder thread (not visible), a pair of ripcords 135, an armor tape 136, and a jacket 138. Armor tape 136 is preferably rolled formed; however, other suitable manufacturing methods may be used. The pair of ripcords 135 are generally disposed about one-hundred and eighty degrees apart with about ninety degree intervals from the armor overlap, thereby inhibiting the shearing of ripcord on an edge of the armor tape during use. In preferred embodiments, ripcords suitable for ripping through an armor tape have a construction as disclosed in U.S. patent application Ser. No. 10/652,046 filed on Aug. 29, 2003, the disclosure of which is incorporated herein by reference. Armor tape 136 can be either a dielectric or a metallic material. If a dielectric armor tape is used the cable may also include a metallic wire for locating the cable in buried applications. In other words, the metallic wire makes the cable tonable. Jacket 138 generally surrounds armor tape 136 and provides environmental protection to cable 130. Of course, other suitable sheath systems may be used about the tube assembly.

Figure 14:
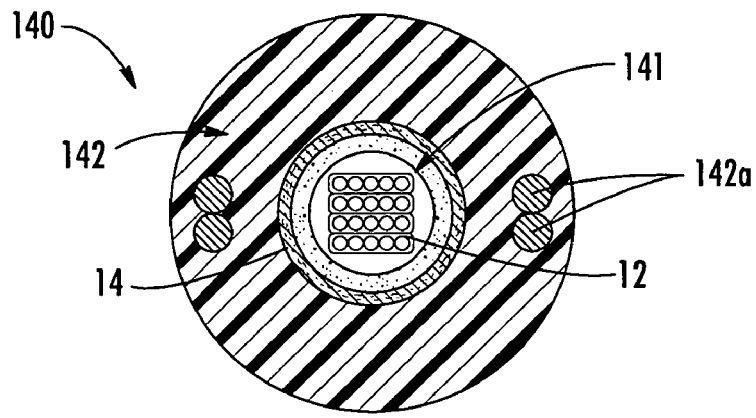
FIG. 14 is a cross-sectional view of a tubeless fiber optic cable according to the present invention.

FIG. 14 depicts fiber optic cable 140. Cable 140 includes at least one optical waveguide 12 and a dry insert 14 forming a cable core 141 within a sheath system 142. In other words, cable 140 is a tubeless design since access to the cable core 141 is accomplished by solely cutting open sheath system 142. Sheath system 142 also includes strength members 142a embedded therein and disposed at about 180 degrees apart, thereby imparting a preferential bend to the cable. Of course, other sheath systems configurations such as different types, quantities, and/or placement of strength members 142a are possible. Cable 140 may also include one or more ripcords 145 disposed between cable core 141 and sheath 142 for ripping sheath 142, thereby allowing the craftsman easy access to cable core 141.

Figure 15:
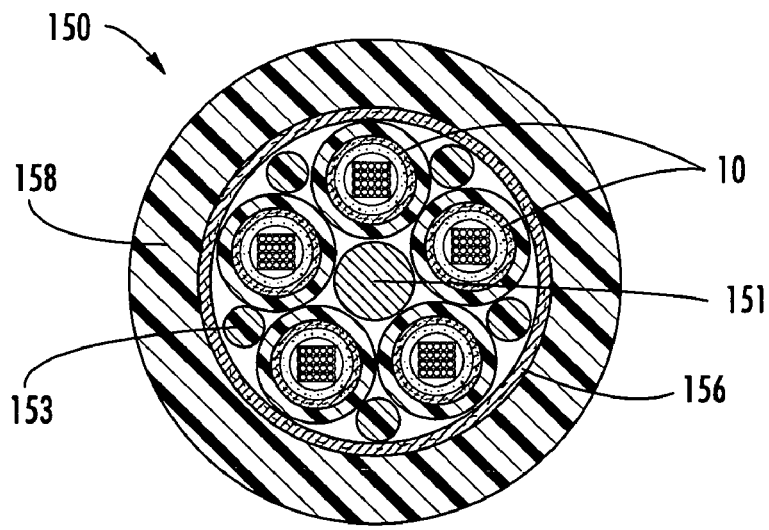
FIG. 15 is a cross-sectional view of a fiber optic cable having stranded tubes according to the present invention.

FIG. 15 depicts a fiber optic cable 150 having a plurality of tube assemblies 10 stranded about a central member 151. Specifically, tube assemblies 10 along with a plurality of filler rods 153 are S-Z stranded about central member 151 and are secured with one or more binder threads (not visible), thereby forming a stranded cable core. The stranded cable core has a water-swellable tape 156 thereabout, which is secured with a binder thread (not visible) before jacket 158 is extruded thereover. Optionally, aramid fibers, other suitable strength members and/or water blocking components such as water-swellable yarns may be stranded about central member 151, thereby forming a portion of the stranded cable core. Likewise, water-swellable components such as a yarns or tape may be placed around central member 151 for inhibiting water migration along the middle of cable 150. Other variations of cable 150 can include an armor tape, an inner jacket, and/or different numbers of tube assemblies.

Figure 16:
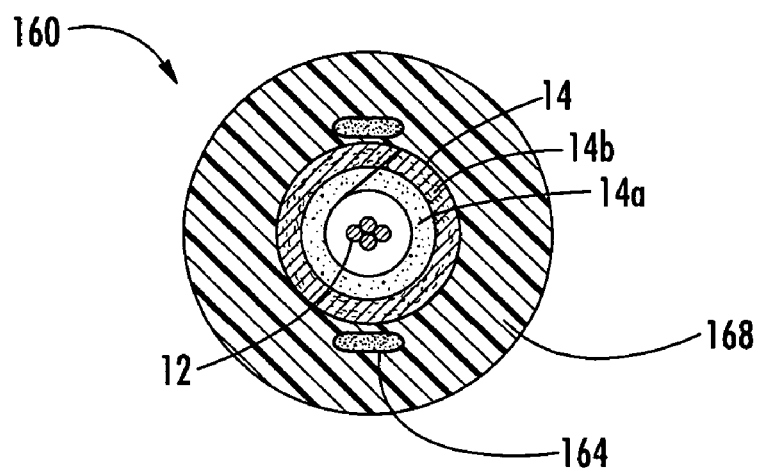
FIGS. 16 and 17 are cross-sectional views of a tubeless fiber optic cable according to the present invention.
Figure 17:
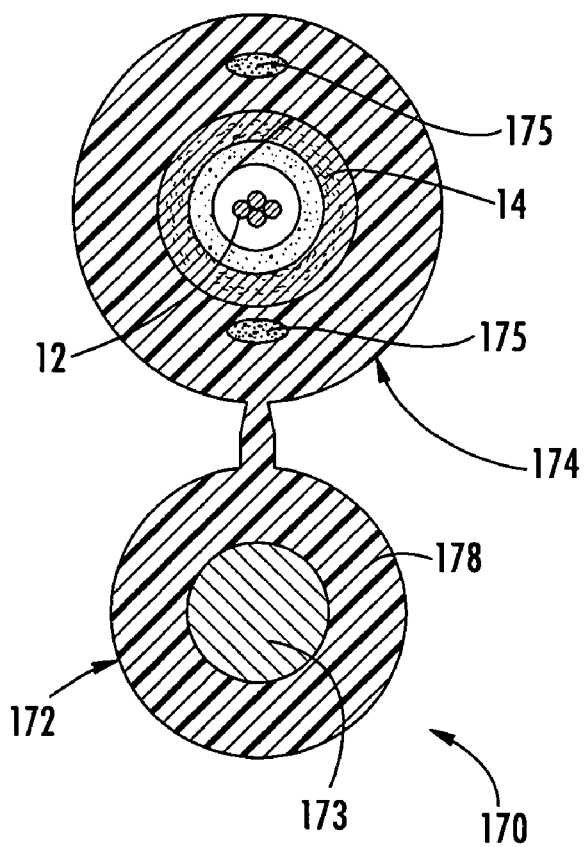

FIGS. 16 and 17 depict explanatory tubeless cable designs according to the present invention. Specifically, cable 160 is a drop cable having at least one optical waveguide 12 generally surrounded by dry insert 14 within a cavity of jacket 168. Cable 160 also includes at least one strength member 164. Other tubeless drop cable configurations are also possible such as round or oval configurations. FIG. 17 depicts a tubeless figure-eight drop cable 170 having a messenger section 172 and a carrier section 174 connected by a common jacket 178. Messenger section 172 includes a strength member 173 and carrier section 174 includes a cavity having at least one optical waveguide 12 that is generally surrounded by dry insert 14. Carrier section 174 can also include at least one anti-buckling member 175 therein for inhibiting shrinkage when carrier section 174 is separated from messenger section 172. Although, FIGS. 16 and 17 depict the dry insert of FIG. 2 any suitable dry insert may be used.

Figure 18A:
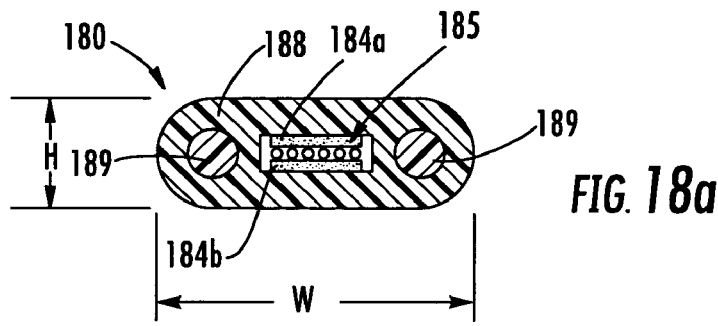

FIGS. 18 and 18a respectively depict cables 180 and 180' that employ the concepts of the present invention in a tubeless cable configuration having a generally flat shape. Cable 180 includes at least one optical waveguide 12 and a plurality of dry inserts 184a,184b that are at least partially disposed within a cavity 188a of a cable jacket 188. As depicted, the major (e.g. planar) surfaces (not numbered) of dry inserts 184a,184b are generally aligned with major (e.g. horizontal) surfaces (not numbered) of cavity 188a, thereby allowing a compact and efficient configuration while generally inhibiting corner fiber contact as occurs with a ribbon stack in a round tube. In this embodiment, optical waveguide 12 is a portion of an optical fiber ribbon 182 (represented by the horizontal line) and dry inserts 184a,184b sandwich a plurality of ribbons 182 in a non-stranded stack, thereby forming a cable core 185. Consequently, cable 180 has the ribbon(s) 182, major surfaces of the dry inserts 184a,184b, and major surfaces of cavity 188a are generally aligned or generally parallel. Additionally, dry inserts 184a,184b contact at least a portion of respective top or bottom ribbons 182. Cable 180 further includes at least one strength member 189 for providing tensile strength and in this embodiment includes two strength members 189 disposed on opposite sides of cavity 188a. Strength members 189 may be formed from any suitable materials such as dielectrics, conductors, composites or the like. Cable 180 is advantageous as a distribution cable as disclosed in U.S. patent application Ser. No. 11/193,516 filed on Jul. 29, 2005, the disclosure of which is incorporated herein by reference. Cable 180' is similar to cable 180, but has six loose optical fibers 12 (instead of ribbons) disposed between dry inserts 184a and 184b. Again, optical fibers 12 contact at least a portion of one of the dry inserts 184a,184b. Of course, cables 180,180' and other similar cables may have applications besides distribution cables such as long-haul, campus, drop, indoor, or other applications.

Ribbon 182 includes twenty-four optical fibers and is a portion of a ribbon stack (not numbered) formed by the plurality of ribbons 182 that are at least partially disposed within cavity 188a (FIG. 18b) of cable jacket 188. Ribbons of the stack may employ a splittable construction using subunits and/or stress concentrations as known in the art, thereby allowing separation of the ribbon into smaller groups of optical fibers. Of course, ribbons could use any suitable number of optical fibers and/or different ribbons could have different numbers of optical fibers. A first dry insert 184a and a second dry insert 184b are disposed within the cavity and are generally disposed on opposite sides of the ribbon stack (or optical fibers as in cable 180'). As depicted in cable 180, dry inserts 184a,184b are generally aligned with a major surface (i.e. the horizontal side) of cavity 188a at the top and bottom and also generally aligned with the width (i.e. major surfaces) of the ribbons, thereby forming an optical ribbon/dry insert composite stack within cavity 188a. Consequently, the rectangular (or square) ribbon stack is fitted to a corresponding generally rectangular (or square) cavity and avoids the issues associated with placing a rectangular (or square) ribbon stack within a round buffer tube (i.e. stresses on the corner fibers of the ribbon stack in a round buffer tube that may cause the cable to fail optical performance requirements such as occurs during bending).

Dry inserts 184a,184b act to couple, cushion, and allow movement and separation of the ribbons (or optical fibers) to accommodate bending of cable 180. Moreover, one or more of the dry inserts may optionally provide water-blocking.

Fiber optic cables like cable 180 are advantageous as distribution cables since they can have a relatively high optical waveguide count with a relatively small cross-sectional footprint. By way of example, one explanatory embodiment of cable 180 has four ribbons with each ribbon having twenty-four optical fibers for a total fiber count of ninety-six fibers. Additionally, the four ribbons of this explanatory embodiment have an excess ribbon length (ERL) of about 0.5% or more such as in range of about 0.6% to about 0.8%. With twenty-four fiber ribbons, cable 180 has a major cable dimension W of about 15 millimeters or less and a minor cable dimension H of about 8 millimeters or less. Furthermore, strength members 189 of this explanatory embodiment are formed from a glass-reinforced plastic (GRP) and have a dimension D of about 2.3 millimeters, which is smaller than the height of cavity 188a. The minimum bend radius of this explanatory embodiment is about 125 millimeters which allows the cable to be coiled in a relatively small diameter for slack storage. Of course, other suitable fiber/ribbon counts, components, ERL and/or cable dimensions are possible with the concepts of the invention. Illustratively, cables similar to cable 180 could have four ribbons with different fiber counts such as: (1) twelve fiber ribbons with a major cable dimension W of about 12 millimeters or less for a total of forty-eight optical fibers; (2) thirty-six fiber ribbons with a major cable dimension W of about 18 millimeters or less for a total of one-hundred and forty-four optical fibers; or (3) forty-eight fiber ribbons with a major cable dimension W of about 21 millimeters or less for a total of two-hundred and sixteen optical fibers.

Figure 18B:
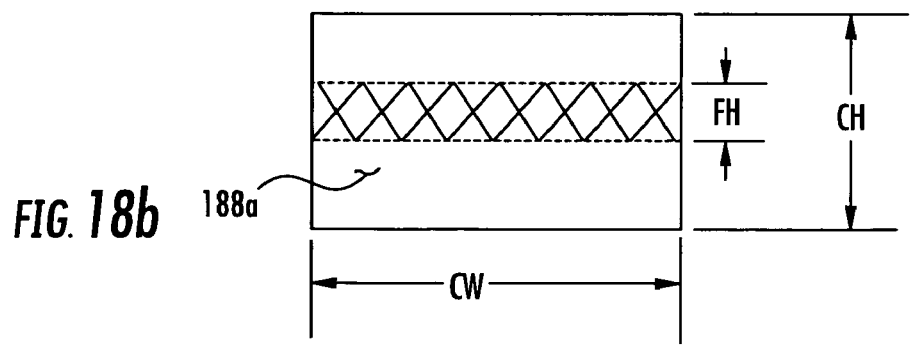
FIG. 18b is a schematic representation of the cavity of the fiber optic cable depicted in FIG. 18.
Figure 19:
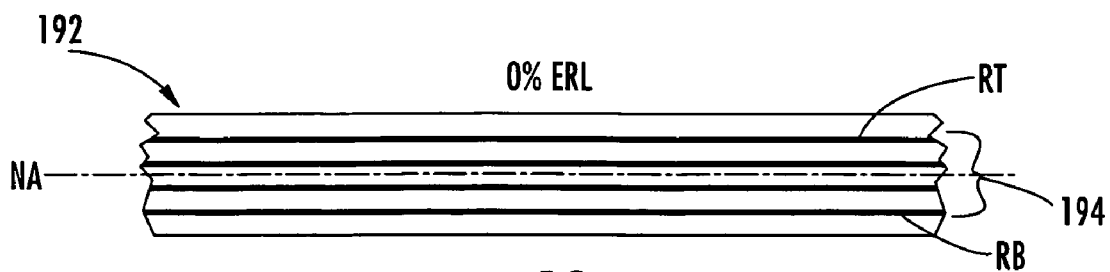
FIGS. 19 and 19a are schematic representations respectively depicting cables with zero excess ribbon length (ERL) and positive ERL.
Figure 19A:
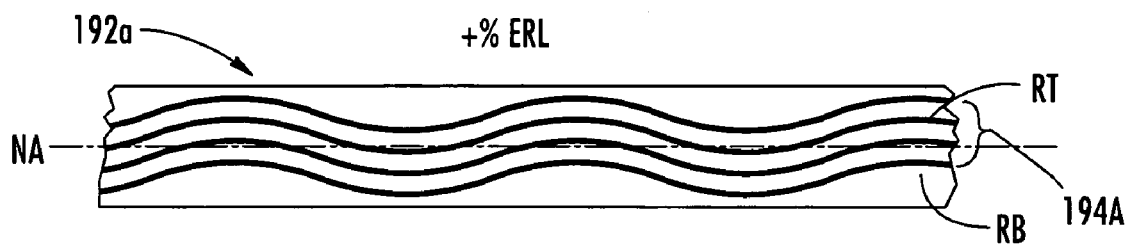

FIG. 18b schematically depicts cavity 188a of cable 180. Cavity 188a has a cavity height CH and a cavity width CW. By way of example for explanatory embodiment discussed above, each ribbon 182 has a height of about 0.3 millimeters for a fiber (ribbon) height FH of about 1.2 millimeters (4 times 0.3 millimeters) and cavity 188a has a cavity height CH of about 5.5 millimeters. Cavity width CW is generally determined by the width of the ribbons (or number of optical fibers) intended for the cable and would be about 7.5 millimeters for the twenty-four fiber ribbons. Dry inserts 184a,184b occupy the cavity on the top and bottom of the ribbon stack. In one embodiment, dry inserts 184a,184b have an uncompressed height h of about 1.8 millimeters, but other suitable uncompressed heights h for dry inserts are possible. As depicted by bar 39 in FIG. 3, this explanatory embodiment with a 5.5 millimeter cavity height CH, fiber height FH of about 1.2 millimeters, and two 1.8 millimeter dry inserts had a normalized ribbon pullout force of about 1.5 N/m, but other suitable normalized ribbon pullout forces are possible. The compression of the dry inserts 184a,184b is the localized maximum compression of the dry insert and generally occurs where the ribbon or ribbon stack has the maximum displacement from the neutral axis if the cable includes a positive ERL as schematically depicted in FIG. 19a.

Illustratively, the explanatory embodiment has a total height for the uncompressed dry inserts and the fiber (i.e. ribbon) height FH of about 4.8 millimeters, which is less than the cavity height of 5.5 millimeters. Consequently, the normalized ribbon pullout force is generally caused by the undulating ribbon stack causing localized maximum compression due to the ERL and/or friction. By way of example, proper coupling of the ribbon stack (or ribbons or optical fibers) may be achieved when the combined uncompressed height of the dry inserts is about 40% or more of the cavity height CH such as by using two 1 millimeter dry inserts with a cavity having a cavity height CH of about 5 millimeters. Of course, other suitable ratios are possible as long as optical performance is preserved. In the explanatory embodiment, the combined uncompressed height (2 times 1.8 millimeters equals 3.6 millimeters) of the dry inserts is about 65% of the cavity height CH (5.5 millimeters), which is more than 50% of the cavity height CH. Of course, the cavity, ribbons, and/or dry inserts can have other suitable dimensions while still providing suitable performance. For instance, thinner ribbons and/or dry inserts may be used. Although cavity 188a is depicted as rectangular it may be difficult to make a rectangular cavity as shown, i.e., the extrusion process may create the cavity with a somewhat irregular rectangular shape. Likewise, the cavity can have other suitable shapes besides generally rectangular such as oval, round or the like, which may generally change the relationship (alignment) among the dry insert, ribbon, and/or cavity.

Dry inserts 184a,184b may be any suitable material such as a compressible layer of, for instance, foam tape for cushioning, coupling, allowing movement of and accommodating bending of the ribbon(s) (or optical fiber(s)) within cavity 188a or other suitable materials. As depicted, dry inserts 184a,184b may optionally also include a water-swellable layer for blocking the migration of water along cavity 188a. By way of example, the dry insert may include a water-swellable tape that is laminated to a compressible layer such as an open-cell polyurethane foam tape, but of course other suitable materials and construction are possible for dry insert(s). Likewise, cables of the present invention may have a dry insert and a separate water blocking component such as a water-swellable yarn or thread disposed within the cavity. In other words, the dry insert and water blocking component may be separate components. As depicted, the water-swellable layer of dry inserts 184a,184b generally faces the cavity (i.e. is separated from the optical fibers or ribbons), but it other embodiments the water-swellable layer may face the optical fiber(s) or ribbons. In a further cable variation, water-swellable tapes are generally aligned with the ribbons in a sandwich configuration in the cavity like in cable 180; however, this cable variation may not provide the desired ribbon coupling.

Generally speaking, positioning dry inserts on opposite ends of the ribbon stack (or single ribbon or loose optical fibers) aids in influencing and maintaining a generally uniform ERL distribution along the cable during different conditions, thereby helping to preserve optical performance. FIGS. 19 and 19a are schematic representations respectively showing the ribbon stacks of two different cables 192,192a, that are similar to cable 180, laid out in a straight configuration (i.e. not in a bending condition). A neutral axis NA of cables 192,192a is represented by the dashed line. More specifically, FIG. 19 represents cable 192 with a ribbon stack 194 having zero ERL and FIG. 19a represents cable 192a with a ribbon stack 194a having a positive ERL. As shown, ribbon stack 194 (no ERL) is generally straight within cable 192 along the neutral axis NA and ribbon stack 194a (positive ERL) has a generally undulating profile about the neutral axis NA to accommodate the ERL. When cables 192,192a are bent the ribbons reposition within the cable to accommodate length changes in the cavity due to bending (i.e. the upper surface of the cavity lengthens and the bottom surface of the cavity is shorter).

Figure 19B:
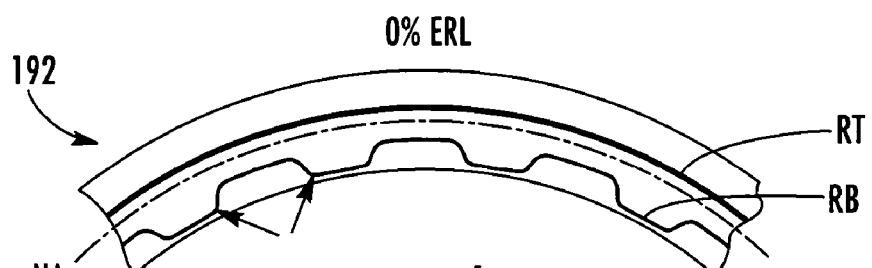
FIGS. 19b and 19c are schematic representations of the cables of FIGS. 19 and 19a during bending of the same.
Figure 19C:
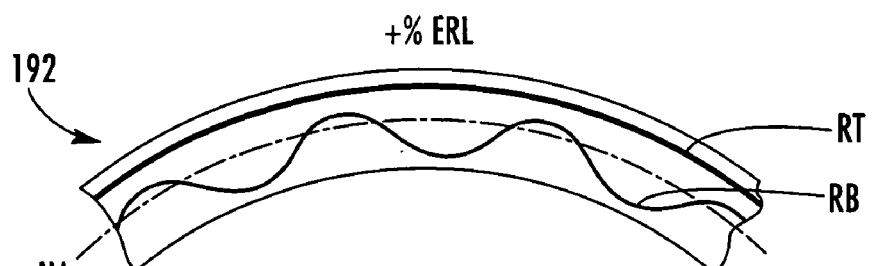

FIGS. 19b and 19c are schematic representations respectively showing cables 192,192a during bending with the two middle ribbons removed for clarity. As depicted in FIG. 19b, a top ribbon RT of ribbon stack 194 (having no ERL) generally moves to a low-stress state near the neutral axis NA of the cable during bending. Consequently, top ribbon RT pushes down on the other ribbons of ribbon stack 194, thereby causing severe bending on the bottom ribbon (along with the other ribbons) of the stack that may cause relatively high levels of optical attenuation or even dark optical fibers. As shown, top ribbon RT forces a bottom ribbon BR of ribbon stack 194 (with no ERL) into sharp bends (see the arrows) that cause relatively high levels of attenuation. On the other hand, FIG. 19c shows that ribbon stack 194a (positive ERL) allows the top ribbon to generally remain above the neutral axis NA of cable 192a, thereby allowing bottom ribbon BR to have a more gradual bends (i.e. the bend is generally sinusoidal), thereby preserving optical performance of bottom ribbon RB. Moreover, ribbon to cable coupling is beneficial for influencing a relatively even ERL distribution along the cable such as during bending, which generally allows for small cable bend radii. Other factors such as the size of cavity and/or compression of the dry insert(s) may also influence ERL/EFL distribution along the cable.

Another optical performance aspect of cables having a generally flat profile with a non-stranded ribbon stack is the total amount of ERL required for suitable cable performance. The amount of ERL for adequate cable performance generally depends on the cable design such as the number of ribbons. Generally speaking, the minimum ERL for cables having a single ribbon is determined by the desired allowable level of fiber strain at the rated cable load; whereas, the minimum ERL for a multiple ribbon cable is generally influenced by bending performance. More specifically, when selecting the minimum ERL limit for a cable design the strength member geometry and material (i.e. cross-sectional area and Young's modulus) should be considered for calculating the desired level of fiber strain at the rated tensile load of the cable design. Additionally, the amount of ERL required for bending generally increases as the number of ribbons in the stack increases since the outer ribbons of the ribbon stack are farther from the neutral axis of the cable. However, there are limits on the upper end of ERL for suitable optical performance (i.e. too much ERL can degrade optical performance). A near optimal upper level of ERL can be calculated using the cavity height CH, ribbon thickness $t_r$, and the desired minimum bend radius R. Equation 1 is a formula for generally matching the bend of the upper surface of the cavity with bend in the ribbon to determine a near optimal upper level of ERL. However, cables can use an upper level for ERL that is greater than given by the formula and still have suitable cable performance.

$$\text{Upper Level } ERL = 50\left(\frac{h - t_r}{R}\right) \quad \text{Equation (1)}$$

As an example of Equation 1, a cable having a cavity height CH of about 4 millimeters, a ribbon thickness of about 0.3 millimeters, and a desired minimum bend radius of about 150 millimeters would have a near optimal upper level of ERL of about 1.2%. Furthermore, cables having relatively high levels of ERL such as in the range of 0.6% to 1.5% may be suitable for self-supporting installations such as NESC heavy loading, but the particular ERL for a given design should have the desired cable performance. On the other hand, cables such as cable 180' having loose optical fibers 12 may have lower values of excess fiber length (EFL) such as about 0.2% EFL since all the optical fibers are located near the neutral axis of the cable.

Figure 20:
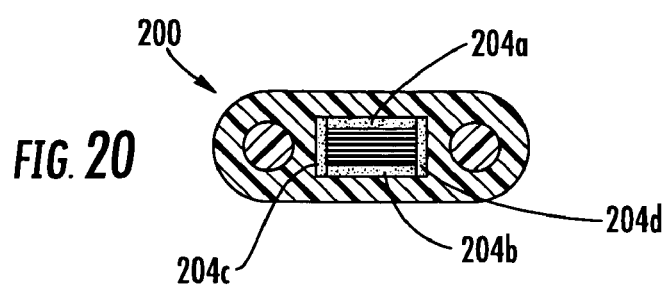
FIG. 20 is a cross-sectional view of a fiber optic cable having a plurality of dry inserts according to the present invention.

Although, dry inserts 184a, 184b of cable 180 are disposed on both the top and bottom of the ribbon stack, one or more dry inserts may be wrapped about the optical fibers or disposed on one or more sides thereof as depicted in FIG. 20. Specifically, FIG. 20 shows four independent dry inserts 204a, 204b, 204c, 204d disposed about the ribbon stack. In another other embodiment, two dry inserts may be placed on the sides of the ribbon stack (i.e. the locations of dry inserts 204c, 204d) instead of the top and bottom of the ribbon stack. In still another embodiment, cables of the present invention can include a single dry insert such as on one side of the ribbon stack or in the middle of the stack (i.e. ribbons on both sides of the dry insert).

Figure 21:
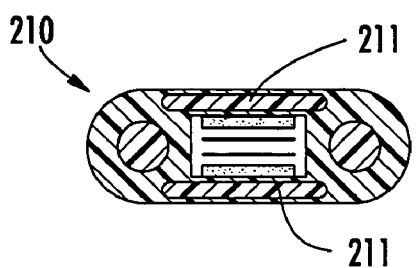
FIGS. 21-25 are cross-sectional views of other fiber optic cables according to the present invention.
Figure 22:
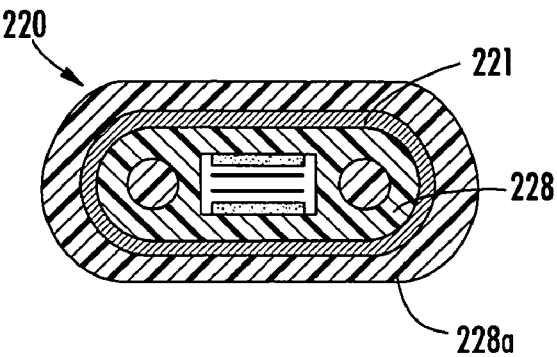

FIG. 21 depicts cable 210 that is similar to cable 180, but it further includes at least one armor layer 211 and in this embodiment two armor layers 211. Armor layers 211 are respectively positioned above and below the cavity for inhibiting unintended breaches such as from rodents or point crushing contacts. Armor layer 211 can be formed from any suitable material such as a conductive material such as steel or a dielectric such as polyamide, polycarbonate, or a braided fabric formed from fiberglass, aramid or the like. FIG. 22 depicts another cable 220 that includes at least one armor layer 221. Cable 220 is similar to cable 180, but has armor layer 221 wrapped about a cable jacket 228 and is further upjacketed with a second jacket 228a, thereby covering armor layer 221.

Figure 23:
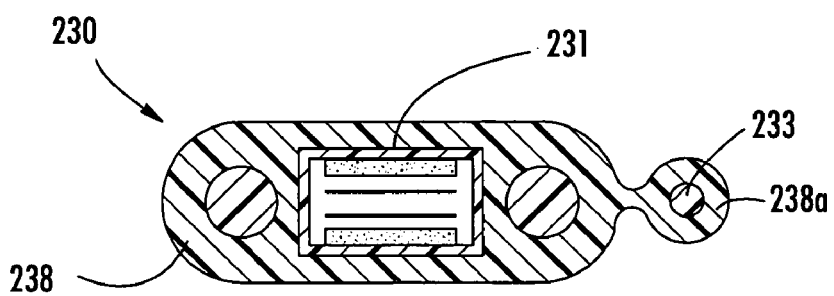

FIG. 23 depicts cable 230 that is similar to cable 180, but it further includes a tube 231 for protecting the optical fibers. Tube 231 can be formed from any suitable material and further protects the optical fibers of the cable. Tube 231 may be formed in a separate extrusion process or as a co-extrusion with a cable jacket 238. Tube 231, along with cable jackets, may be formed from any suitable material such as a polymer. By way of example, one embodiment has a tube formed of HDPE and cable jacket is formed from a MDPE, but any suitable combination of materials may be used. Likewise, flame retardant materials may be used, thereby making the cables suitable for indoor applications. Additionally, cable 230 further includes a toning lobe 238a having a toning wire 233 useful for locating the cable in buried applications. Toning lobe 238a is connected to cable jacket 238 by a web (not numbered), thereby allowing toning lobe 238a to be separated from the main cable body. Additionally, cables without a toning lobe may have the capability of being tonable by using one or more cable components that are conductive. Furthermore, cables can conduct electrical power if one or more of the cable components are conductive such as including a twisted pair of copper wires or using conductive strength members.

Figure 24:
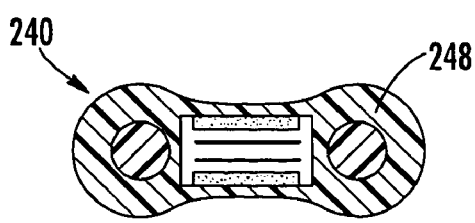
Figure 25:
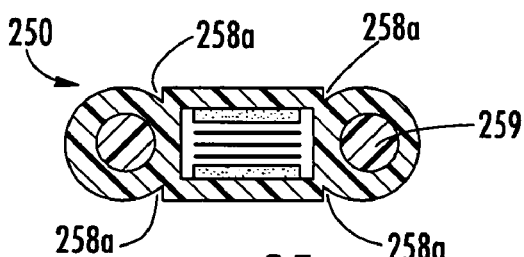

FIGS. 24 and 25 respectively depict cables 240 and 250 that are similar to cable 180, but have different cross-sectional cable shapes. Cable 240 depicts a generally dog-bone cable cross-section for cable jacket 248 and cable 250 illustrates another variation on the cable cross-section. Cable 250 has recessed portions 258a so that the craft can separate one or more of strength members 259 along a portion of the cable. Of course, other cross-sectional shapes are possible with the concepts of the invention.

Figure 26:
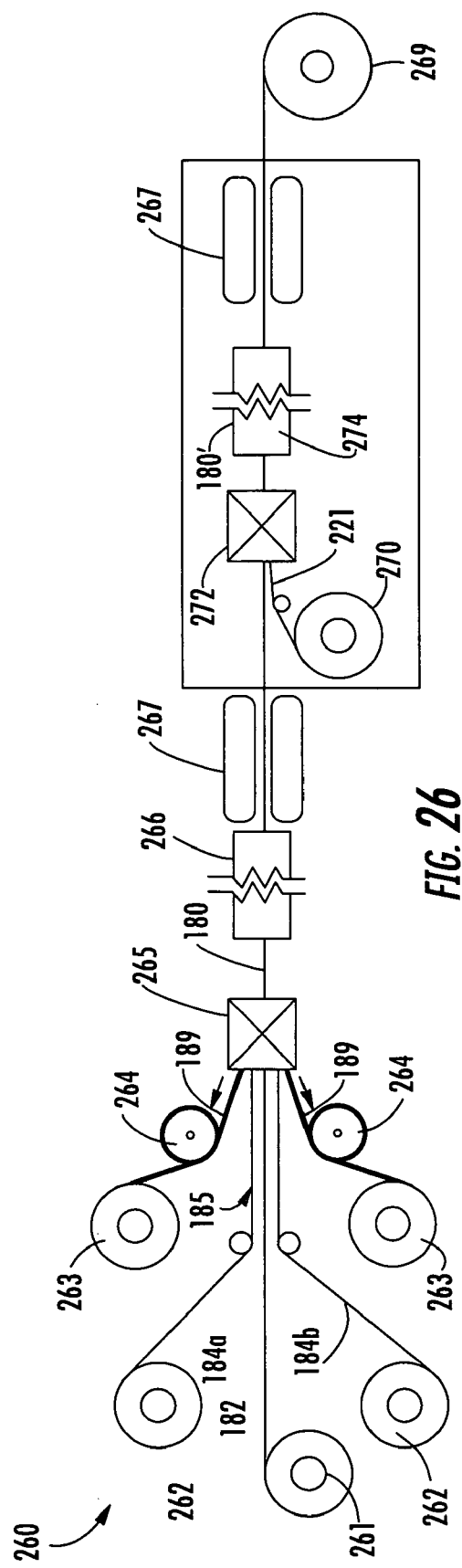
FIG. 26 is a schematic representation of a manufacturing line for making the cable of FIG. 18 according to the present invention.

FIG. 26 schematically illustrates an exemplary manufacturing line 260 for cable 180 according to the present invention; however, other variations of the concepts may be used to manufacture other assemblies and/or cables according to the concepts of the present invention. Manufacturing line 260 includes at least one optical ribbon payoff reel 261, a plurality of dry insert payoff reels 262, a plurality of strength member payoff reels 263, a plurality of strength member capstans 264, a cross-head extruder 265, a water trough 266, one or more caterpullers 267, and a take-up reel 269. Additionally, cable 180 may further include an armor layer and a second cable jacket therearound, thereby forming a cable similar to cable 220 as illustrated in FIG. 22. The armor layer and/or second cable jacket can be manufactured on the same line as cable 180 or on a second manufacturing line. The exemplary manufacturing process includes paying-off at least one optical fiber ribbon 182 and dry insert 184a,184b from respective reels 261, 262, and 262. Only one payoff reel for optical fiber ribbon 182 is shown for clarity. However, manufacturing lines can include any suitable number of payoff reels for one or more ribbons or optical fibers in order to manufacture assemblies and/or cables according to the present invention. Thereafter, dry inserts 184a,184b are generally positioned about optical fiber ribbon 182, thereby forming cable core 185 (i.e. a dry insert-ribbon composite stack or sandwich). Additionally, strength members 189 are paying-off respective reels 263 under a relatively high tension (e.g. between about 100 to about 400 pounds) using respective strength member capstans 264, thereby elastically stretching strength members 189 (represented by the arrows) so that ERL is produced in the cable. In other words, after the tension is released on strength members 189 they return to their original unstressed length (i.e. shorten), thereby producing ERL since the ribbons were introduced into the cable with about the same length as tensioned strength members and the ribbons were not stretched. Stated another way, the amount of ERL produced is equal to about the strength member strain plus any plastic shrinkage of the cable jacket that may occur. Thereafter, cable core 185 and strength members 189 are fed into cross-head extruder 265 where cable jacket 188 is extruded about cable core 185 and strength members 189, thereby forming cable 180. Cable 180 is then quenched in water trough 266. Cable 180 is pulled through the manufacturing line using one or more caterpullers 267 and then wound onto take-up reel 269 under low tension. As depicted in the box, if one manufacturing line is set-up to make cable similar to cable 220, then a second caterpuller 267 is used for pulling the cable assembly as the armor layer 221 is paid-off a reel 270 and formed about cable 180 using suitable armor forming equipment (not depicted), and a second jacket 188a is extruded thereover using a cross-head extruder 272. Thereafter, the armored cable 180' passes into a second water trough 274 before being wound-up on take-up reel 269. Additionally, other cables and/or manufacturing lines according to the concepts of the present invention are possible. For instance, cables and/or manufacturing lines may include a water-swellable tape, yarn, or the like; however, the use of one or more other suitable cable components are possible.

Many modifications and other embodiments of the present invention, within the scope of the appended claims, will become apparent to a skilled artisan. For example, optical waveguides can be formed in a variety of ribbon stacks or configurations such as a stepped profile of the ribbon stack (i.e. the ribbon stack cross-section is in the shape of a plus sign). Cables according to the present invention can also include more than one optical tube assembly stranded helically, rather than S-Z stranded configurations. Additionally, dry inserts of the present invention can be laminated together as shown or applied as individual components. Therefore, it is to be understood that the invention is not limited to the specific embodiments disclosed herein and that modifications and other embodiments may be made within the scope of the appended claims. Although specific terms are employed herein, they are used in a generic and descriptive sense only and not for purposes of limitation. The invention has been described with reference to silica-based optical waveguides, but the inventive concepts of the present invention are applicable to other suitable optical waveguides and/or cable configurations.

That which is claimed:

1. A fiber optic cable comprising:
   at least one optical waveguide;
   a cable jacket, the cable jacket having a cavity therein and the cavity has a major surface, wherein the at least one optical waveguide is at least partially disposed within the cavity;
   at least two strength members, the at least two strength members being attached to the cable jacket and disposed on opposite sides of the cavity; and
   a first dry insert and a second dry insert, the first and second dry inserts being disposed within the cavity so that the at least one optical waveguide is disposed between the first dry insert and the second dry insert for coupling the at least one optical waveguide to the cable jacket, wherein the at least one optical waveguide has a normalized pull-out force of at least about 0.5 N/m, and the first dry insert has a major surface that is generally aligned with the major surface of the cavity.

2. The fiber optic cable of claim 1, the at least one optical waveguide being a portion of a fiber optic ribbon.

3. The fiber optic cable of claim 2, the at least one optical waveguide having an excess ribbon length that is about 0.2% or greater.

4. The fiber optic cable of claim 1, the first and second dry inserts having a combined uncompressed height, the combined uncompressed height being about 40% or more of a cavity height (CR).

5. The fiber optic cable of claim 1, further comprising at least one armor layer for protecting the fiber optic cable.

6. The fiber optic cable of claim 1, one of the at least two strength members having a strength member dimension (D), wherein the cavity has a cavity height (CH) and the cavity height (CH) is larger than the strength member dimension (D).

7. The fiber optic cable of claim 1, the cavity having a generally rectangular shape and the at least one optical waveguide being a portion of a fiber optic ribbon that is one of a plurality of fiber optic ribbons that are disposed within the cavity.

8. The fiber optic cable of claim 1, further comprising a water-swellable component within the cavity for inhibiting the migration of water along the cavity.

9. The fiber optic cable of claim 1, a minor dimension of the fiber optic cable (H) being about 8 millimeters or less and a major dimension of the fiber optic cable (W) being about 15 millimeters or less.

10. The fiber optic cable of claim 1, one of the first or second dry inserts having a compressible layer and a water-swellable layer.

11. The fiber optic cable of claim 1, one of the first or second dry inserts being a foam tape.

12. The fiber optic cable of claim 1, the first dry insert includes a water-swellable layer, wherein the water swellable layer faces outward towards the cavity.

13. The fiber optic cable of claim 1, the at least one optical waveguide being a portion of a fiber optic ribbon, wherein the fiber optic ribbon is nonstranded within the cavity.

14. The fiber optic cable of claim 1, the at least one optical waveguide contacting at least a portion of the first dry insert.

15. The fiber optic cable of claim 1, the at least one optical waveguide having a normalized pullout force between about 0.5 N/m and about 5.0 N/m.

16. The fiber optic cable of claim 1, the at least one optical waveguide being a portion of a fiber optic ribbon, wherein the fiber optic ribbon contacts at least a portion of the first dry insert.

17. The fiber optic cable of claim 1, the fiber optic cable being a tubeless configuration.

18. The fiber optic cable of claim 1, the fiber optic cable being a tubeless configuration, wherein the at least one optical waveguide is a portion of a fiber optic ribbon that is non-stranded and has an excess ribbon length of 0.5% or greater.

19. A fiber optic cable comprising:
a plurality of fiber optic ribbons, the plurality of fiber optic ribbons having an excess ribbon length (ERL) and being non-stranded, the ERL being about 0.5% or greater;
a cable jacket, wherein the plurality of fiber optic ribbons are at least partially disposed within a cavity;
at least two strength members, the at least two strength members being attached to the cable jacket and disposed on opposite sides of the cavity; and
at least one dry insert, the at least one dry insert being disposed within the cavity and contacting at least one of the plurality of fiber optic ribbons for coupling the plurality of fiber optic ribbons to the cable jacket, wherein the plurality of fiber optic ribbons have a normalized ribbon coupling force of at least about 0.5 N/m.

20. The fiber optic cable of claim 19, further comprising a first dry insert and a second dry insert and the plurality of optical fiber ribbons being disposed between the first dry insert and the second dry insert.

21. The fiber optic cable of claim 20, the first and second dry inserts having a combined uncompressed height, the combined uncompressed height being about 40% or more of a cavity height (CH).

22. The fiber optic cable of claim 19, further comprising at least one armor layer for protecting the fiber optic cable.

23. The fiber optic cable of claim 19, further comprising at least one strength member having a strength member dimension (D), wherein the cavity has a cavity height (CH) and the cavity height (CH) is larger than the strength member dimension (D).

24. The fiber optic cable of claim 19, further comprising a water-swellable component within the cavity for inhibiting the migration of water along the cavity.

25. The fiber optic cable of claim 19, a minor dimension of the fiber optic cable (H) being about 8 millimeters or less and a major dimension of the fiber optic cable (W) being about 15 millimeters or less.

26. The fiber optic cable of claim 19, the at least one dry insert having a plurality of layers including a compressible layer and a water-swellable layer.

27. The fiber optic cable of claim 19, the at least one dry insert being a foam tape.

28. The fiber optic cable of claim 19, the at least one dry insert includes a water swellable layer, wherein the water-swellable layer faces outward towards the cavity.

29. The fiber optic cable of claim 19, one of the plurality of ribbons contacting at least a portion of the at least one dry insert.

30. The fiber optic cable of claim 19, the plurality of fiber optic ribbons having a normalized ribbon coupling force between about 0.5 N/m and 5.0 N/m.

31. The fiber optic cable of claim 19, the fiber optic cable being a tubeless configuration.

32. A fiber optic cable comprising:
at least one optical waveguide;
a cable jacket, the cable jacket having a cavity with a cavity height (CH), wherein the at least one optical waveguide is at least partially disposed within the cavity so that the at least one optical waveguide has a normalized pull-out force of at least about 0.5 N/m; and
at least one dry insert for coupling the at least one optical waveguide to the cable jacket, wherein a total dry insert height is defined as the sum of the uncompressed heights of all of the dry inserts disposed within the cavity, the total dry insert height being about 40% or more of the cavity height (CH).

33. The fiber optic cable of claim 32, further comprising a first dry insert and a second dry insert, wherein the at least one optical waveguide is disposed between the first dry insert and the second dry insert.

34. The fiber optic cable of claim 32, the cavity having a generally rectangular shape.

35. The fiber optic cable of claim 32, the at least one optical waveguide being a portion of a fiber optic ribbon.

36. The fiber optic cable of claim 32, the at least one optical waveguide being a portion of a fiber optic ribbon, wherein the fiber optic ribbon has an excess ribbon length (ERL).

37. The fiber optic cable of claim 32, further comprising at least one armor layer for protecting the fiber optic cable.

38. The fiber optic cable of claim 32, further comprising at least two strength members that are disposed on opposite sides of the cavity.

39. The fiber optic cable of claim 32, further comprising at least one strength member having a strength member dimension (D), wherein the cavity height (CH) is larger than the strength member dimension (D).

40. The fiber optic cable of claim 32, the at least one optical waveguide being a portion of a fiber optic ribbon that is one of a plurality of fiber optic ribbons at least partially disposed within the cavity, at least one of the plurality of fiber optic ribbons having twenty-four optical fibers.

41. The fiber optic cable of claim 32, further comprising a water swellable component within the cavity for inhibiting the migration of water along the cavity.

42. The fiber optic cable of claim 32, a minor dimension of the fiber optic cable (H) being about 8 millimeters or less and a major dimension of the fiber optic cable (W) being about 15 millimeters or less.

43. The fiber optic cable of claim 32, the at least one dry insert having a plurality of layers including a compressible layer and a water-swellable layer.

44. The fiber optic cable of claim 32, the at least one dry insert being a foam tape.

45. The fiber optic cable of claim 32, further comprising a first dry insert and a second dry insert and the at least one optical waveguide being a portion of a fiber optic ribbon that is one of a plurality of fiber optic ribbons at least partially disposed between the first dry insert and the second dry insert.

46. The fiber optic cable of claim 32, the at least one dry insert includes a water swellable layer, wherein the water-swellable layer faces outward towards the cavity.

47. The fiber optic cable of claim 32, the at least one optical fiber being a portion of a fiber optic ribbon, wherein the fiber optic ribbon is non-stranded within the cavity.

48. The fiber optic cable of claim 32, the at least one optical fiber contacting at least a portion of the at least one dry insert.

49. The fiber optic cable of claim 32, the at least one optical waveguide having a normalized pull-out force between about 0.5 N/m and about 5.0 N/m.

50. The fiber optic cable of claim 32, the at least one optical waveguide being a portion of a fiber optic ribbon, wherein the fiber optic ribbon contacts at least a portion of the at least one dry insert.

51. The fiber optic cable of claim 32, the fiber optic cable being a tubeless configuration.

52. A method of making a fiber optic cable including the steps of:
paying off at least one optical fiber;
paying off a first dry insert;
paying off a second dry insert;
positioning the at least one optical fiber between the first dry insert and the second dry insert, thereby forming a cable core; and applying a cable jacket about the cable core so that the first dry insert and second dry insert couple the at least one optical waveguide to the cable jacket, wherein the at least one optical fiber has a normalized pull-out force of at least about 0.5 N/m.

53. The method of claim 52, further including the step of providing at least one strength member, wherein the at least one strength member is elastically stretched during a portion of the manufacturing, thereby providing an excess fiber length for the at least one optical fiber within the cable after the tension is removed from the at least one strength member.

54. The method of claim 52, the at least one optical fiber being a portion of a fiber optic ribbon and further including the step of providing at least one strength member, wherein the at least one strength member is elastically stretched during a portion of the manufacturing, thereby providing an excess ribbon length for the fiber optic ribbon within the cable after the tension is removed from the at least one strength member.

55. The method of claim 52, further including the step of paying off a plurality of fiber optic ribbons, wherein the at least one optical fiber is a portion of one of the plurality of fiber optic ribbons.

56. The method of claim 52, further including the step of paying off an armor layer for protecting the fiber optic cable.

57. The method of claim 52, further including the step of paying off an armor layer after applying a cable jacket about the cable core and applying a second cable jacket about the armor layer.

58. The method of claim 52, the at least one optical fiber having a normalized pullout force between about 0.5 N/m and about 5.0 N/m.

59. The method of claim 52, wherein the first dry insert includes a foam tape.

60. The method of claim 52, wherein the fiber optic cable is a tubeless configuration.

61. A fiber optic cable comprising:
at least one optical waveguide;
a cable jacket the cable jacket having a cavity therein wherein the at least one optical waveguide is at least partially disposed within the cavity;
at least two strength members, the at least two strength members being attached to the cable jacket and disposed on opposite sides of the cavity; and
a first dry insert having a compressible layer, the first dry insert being disposed within the cavity for coupling the at least one optical waveguide to the cable jacket wherein the at least one optical waveguide has a normalized pull-out force of at least about 0.5 N/m.

62. The fiber optic cable of claim 61, further including a second dry insert, wherein the at least one optical waveguide is disposed between the first dry insert and the second dry insert.

63. The fiber optic cable of claim 61, the at least one optical waveguide having a normalized pull-out force between about 0.5 N/m and about 5.0 N/m.

64. The fiber optic cable of claim 61, the first dry insert being generally aligned with a major dimension of the fiber optic cable (W).

65. The fiber optic cable of claim 61, the at least one optical waveguide being a portion of fiber optic ribbon and further including a second dry insert, wherein the fiber optic ribbon is disposed between the first dry insert and the second dry insert, wherein the first dry insert, the second dry insert and the fiber optic ribbon are all generally aligned with a major dimension of the fiber optic cable (W).

66. The fiber optic cable of claim 61, the fiber optic cable being a tubeless configuration.

67. A fiber optic cable comprising:
at least one fiber optic ribbon;
a cable jacket, the cable jacket having a cavity therein, wherein the at least one fiber optic ribbon is non-stranded and at least partially disposed within the cavity and the cable jacket defines a tubeless cable configuration;
at least two strength members, the at least two strength members being attached to the cable jacket and disposed on opposite sides of the cavity;
a first dry insert having a compressible layer for coupling and cushioning the fiber optic ribbon, and
a second dry insert having a compressible layer for coupling and cushioning the fiber optic ribbon, the at least one fiber optic ribbon being disposed between the first dry insert and the second dry insert, wherein the at least one fiber optic ribbon has a normalized pullout force of at least about 0.5 N/m.

68. The fiber optic cable of claim 67, wherein the first dry insert, the second dry insert and the at least one fiber optic ribbon are all generally aligned with a major dimension of the fiber optic cable (W).

69. The fiber optic cable of claim 67, wherein the first dry insert includes a foam tape.

70. The fiber optic cable of claim 67, the at least one fiber optic ribbon contacting at least a portion of the first dry insert.

71. The fiber optic cable of claim 67, the first dry insert including a water swellable layer.

72. The fiber optic cable of claim 67, further comprising a water-swellable component within the cavity for inhibiting the migration of water along the cavity.

73. The fiber optic cable of claim 67, a minor dimension of the fiber optic cable (H) being about 2 millimeters or less and a major dimension of the fiber optic cable (W) being about 15 millimeters or less.

74. The fiber optic cable of claim 67, the at least one fiber optic ribbon having a normalized ribbon coupling force between about 0.5 N/m and 5.0 N/m.

75. The fiber optic cable of claim 67, further comprising at least one armor layer for protecting the fiber optic cable.

* * * * *